(12) United States Patent
Mokuo et al.

(10) Patent No.: US 11,438,474 B2
(45) Date of Patent: Sep. 6, 2022

(54) IMAGE READING APPARATUS WITH MOVABLE APPARATUS BODY

(71) Applicant: SEIKO EPSON CORPORATION, Tokyo (JP)

(72) Inventors: Tomoyuki Mokuo, Kitakyushu (JP); Tokujiro Okuno, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/073,508

(22) Filed: Oct. 19, 2020

(65) Prior Publication Data

US 2021/0120135 A1  Apr. 22, 2021

(30) Foreign Application Priority Data

Oct. 21, 2019  (JP) .............................. JP2019-191776

(51) Int. Cl.
*H04N 1/04* (2006.01)
*H04N 1/00* (2006.01)

(52) U.S. Cl.
CPC ..... *H04N 1/00527* (2013.01); *H04N 1/00535* (2013.01); *H04N 1/00681* (2013.01); *H04N 1/00904* (2013.01)

(58) Field of Classification Search
None
See application file for complete search history.

(56) References Cited

U.S. PATENT DOCUMENTS

| 6,388,775 | B1* | 5/2002 | Chiu | H04N 1/00519 |
| | | | | 358/474 |
| 10,165,140 | B2* | 12/2018 | Mokuo | H04N 1/00602 |
| 2007/0188818 | A1* | 8/2007 | Westcott | H04N 1/00583 |
| | | | | 358/296 |
| 2013/0163056 | A1* | 6/2013 | Hanayama | H04N 1/0005 |
| | | | | 358/474 |
| 2016/0316087 | A1* | 10/2016 | Hanayama | H04N 1/00037 |
| 2018/0041651 | A1* | 2/2018 | Nakamura | H04N 1/00588 |
| 2018/0257895 | A1* | 9/2018 | Kaneko | B65H 31/22 |
| 2019/0132455 | A1 | 5/2019 | Miyauchi et al. | |
| 2019/0233241 | A1* | 8/2019 | Kaneko | B65H 31/00 |
| 2019/0297215 | A1* | 9/2019 | Miyauchi | B65H 7/02 |
| 2020/0076974 | A1* | 3/2020 | Koyanagi | H04N 1/00535 |

FOREIGN PATENT DOCUMENTS

| CN | 109729230 | 5/2019 |
| JP | 2009-527143 A | 7/2009 |

* cited by examiner

*Primary Examiner* — Dung D Tran
(74) *Attorney, Agent, or Firm* — Workman Nydegger

(57) ABSTRACT

An image reading apparatus includes a support portion in contact with a mount surface on which the apparatus is mounted, an apparatus body portion that is provided so that a position thereof is changeable by being rotated relative to the support portion, and a discharge tray provided so as to be openable/closeable relative to the apparatus body portion, the discharge tray receiving the original. The apparatus body portion is switchable between a first position that is a position while not in use, and a second position in which reading of the original is performed. When the apparatus body portion is in the first position and when the discharge tray is opened from the closed state, the discharge tray switches the apparatus body portion from the first position to the second position.

6 Claims, 22 Drawing Sheets

IMAGE READING APPARATUS WITH MOVABLE APPARATUS BODY

The present application is based on, and claims priority from JP Application Serial Number 2019-191776, filed Oct. 21, 2019, the disclosure of which is hereby incorporated by reference herein in its entirety.

BACKGROUND

1. Technical Field

The present discloser relates to an image reading apparatus that reads an original image.

2. Related Art

In a scanner that is an example of the image reading apparatus, there is one as in JP-T-2009-527143 configured to change the installed position by switching between a first state in which a sheet transport path provided in a housing constituting an apparatus body is inclined against the horizontal direction, and a second state in which the sheet transport path is closer to the horizontal direction with respect to the first state.

When in the first state, the image reading apparatus of JP-T-2009-527143 can suppress an increase in the size of the apparatus since the sheet transport path is inclined against the horizontal direction. Furthermore, when in the second state, since the sheet transport path is closer to the horizontal direction with respect to the first state, impinging of a front end portion of a sheet against the floor surface on which the image reading apparatus is installed can be prevented when discharging a sheet with high stiffness.

While an image reading apparatus that is configured to change its position in the manner described above is known, there is room for improvement when viewed from the point of usability of the apparatus.

SUMMARY

An image reading apparatus according to the present disclosure that overcomes the issue described above includes a support portion in contact with a mount surface on which the apparatus is mounted, an apparatus body portion that includes a reading member that reads an original, the apparatus body portion being provided so that a position thereof is changeable by being rotated relative to the support portion, and a discharge tray provided so as to be openable/closeable by being rotated relative to the apparatus body portion, the discharge tray, by being open, receiving the original discharged from the apparatus body portion. In the image reading apparatus, the apparatus body portion is switchable between a first position that is a position while not in use, and a second position that is a position of the apparatus body portion when reading of the original with the reading member is performed and that is a position in which a projected area of the apparatus body portion on the mount surface is larger than that of the first position. When the apparatus body portion is in the first position and when the discharge tray is opened from the closed state, the discharge tray engages with the support portion and applies force to the apparatus body portion in a direction that switches the apparatus body portion from the first position to the second position to switch the apparatus body portion from the first position to the second position.

DESCRIPTION OF EXEMPLARY EMBODIMENTS

Figure 1:
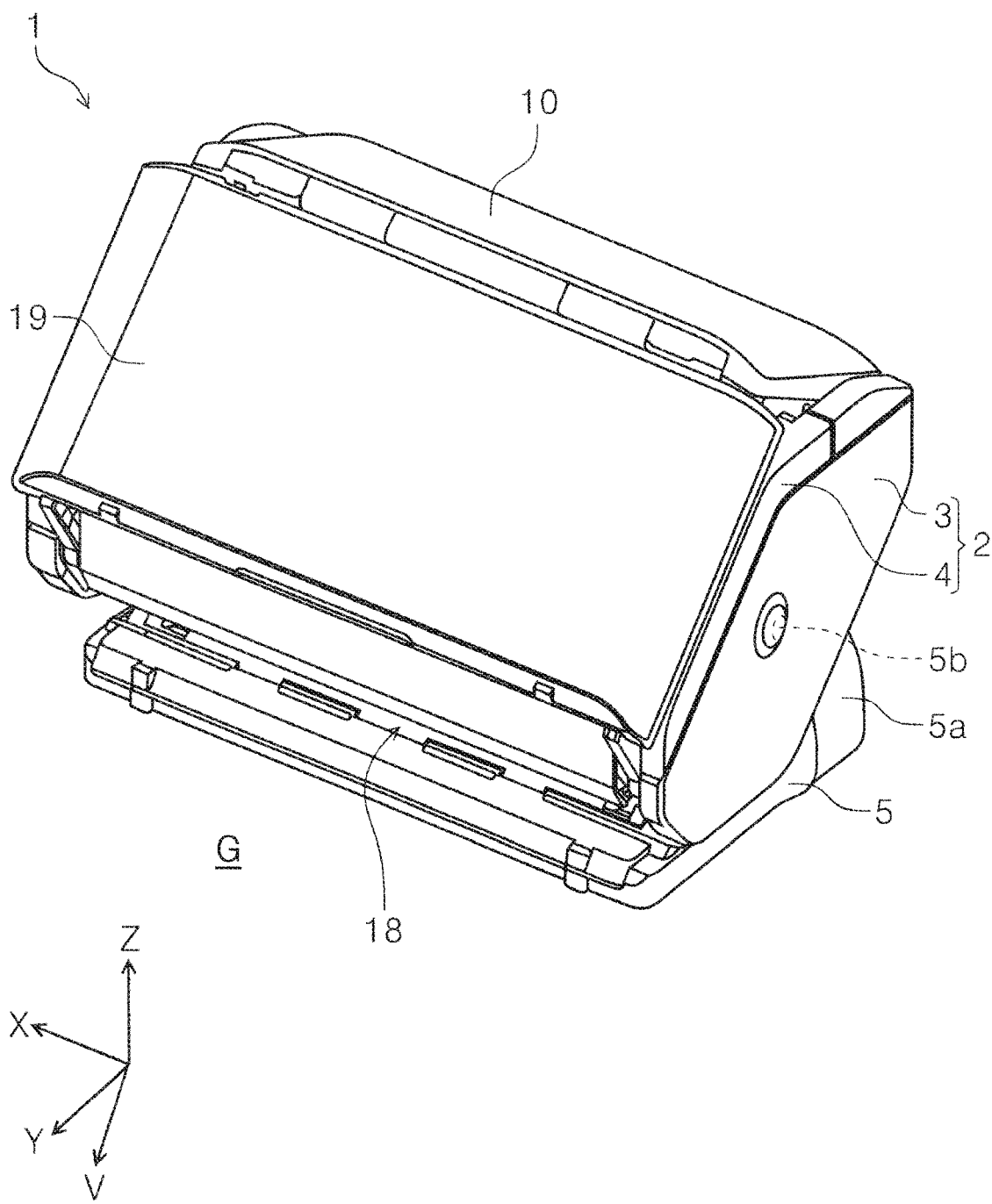
FIG. 1 is an external perspective view viewing an apparatus body portion in a second position from the front.

Hereinafter, an outline of the present disclosure will be described.

An image reading apparatus according to a first aspect includes a support portion in contact with a mount surface on which the apparatus is mounted, an apparatus body portion that includes a reading member that reads an original, the apparatus body portion being provided so that a position thereof is changeable by being rotated relative to the support portion, and a discharge tray provided so as to be openable/closeable by being rotated relative to the apparatus body portion, the discharge tray, by being open, receiving the original discharged from the apparatus body portion. In the image reading apparatus, the apparatus body portion is switchable between a first position that is a position while not in use, and a second position that is a position of the apparatus body portion when reading of the original with the reading member is performed and that is a position in which a projected area of the apparatus body portion on the mount surface is larger than that of the first position. When the apparatus body portion is in the first position and when the discharge tray is opened from the closed state, the discharge tray engages with the support portion and applies force to the apparatus body portion in a direction that switches the apparatus body portion from the first position to the second position to switch the apparatus body portion from the first position to the second position.

According to the present aspect, when the apparatus body portion is in the first position and when the discharge tray is opened from the closed state, the discharge tray engages with the support portion and applies force to the apparatus body portion in the direction that switches the apparatus body portion from the first position to the second position to switch the apparatus body portion from the first position to the second position; accordingly, other than the operation of opening the discharge tray, an operation of switching the apparatus body portion from the first position to the second position is not needed and the usability of the apparatus is improved.

In a second aspect according to the first aspect, the discharge tray is rotatably attached to the apparatus body portion through an arm portion, and the support portion includes an abutting surface. When the apparatus body portion is in the first position and when the discharge tray is opened from the closed state, the arm portion abuts against the abutting surface to apply force to the apparatus body portion in the direction that switches the apparatus body portion from the first position to the second position.

According to the present aspect, the member in which the discharge tray applies force to the apparatus body portion in the direction that switches the apparatus body portion from the first position to the second position is obtained with a simple configuration.

A third aspect according to the first or second aspect further includes a control portion that controls supplying of electric power in the apparatus body portion, a first position detection portion that detects the first position of the apparatus body portion, and a second position detection portion that detects the second position of the apparatus body portion. In the third aspect, the control portion is configured to switch between a first power supplying mode that is a power supplying mode when the reading member reads the original, and a second power supplying mode that is a power supplying mode in which consumption of electric power is smaller than that of the first power supplying mode and that is a power supplying mode while the apparatus body portion is not in use, and in a case in which the position of the apparatus body portion is in the first position and in which the apparatus body portion is in the second power supplying mode, when a change in the apparatus body portion from the first position to the second position is detected, the control portion makes a transition to the first power supplying mode.

According to the present aspect, in the case in which the position of the apparatus body portion is in the first position and in which the apparatus body portion is in the second power supplying mode, when the change in the apparatus body portion from the first position to the second position is detected, the control portion makes the transition to the first power supplying mode; accordingly, the user does not have to perform an operation pertaining to the power source after the position of the apparatus body portion has been changed from the first position to the second position and the usability of the apparatus is improved.

In a fourth aspect according to the third aspect, when a change in the apparatus body portion from the second position to the first position is detected, the control portion makes a transition to the second power supplying mode.

According to the present aspect, when the change in the apparatus body portion from the second position to the first position is detected, the control portion makes the transition to the second power supplying mode; accordingly, the user does not have to perform an operation pertaining to the power source after the position of the apparatus body portion has been changed from the second position to the first position and the usability of the apparatus is improved.

In a fifth aspect according to any one of the first to fourth aspects, a display portion configured to allow visual confirmation of a power status is provided in the apparatus body portion, and the discharge tray covers the display portion when in a closed state and exposes the display portion when opened.

According to the present aspect, since the display portion configured to allow visual confirmation of the power status is provided in the apparatus body portion, and the discharge tray covers the display portion when in the closed state and exposes the display portion when opened, the power status of the apparatus can be confirmed with the display portion.

A sixth aspect according to any one of the first to fifth aspects further includes an attenuating member that attenuates a rotation of the discharge tray in at least an opening direction thereof.

According to the present aspect, since an attenuation member that attenuates the rotation of the discharge tray in at least the opening direction is included, noise, damage, and the like due to vigorously opening the discharge tray can be suppressed.

An image reading apparatus according to a seventh aspect includes an apparatus body portion that includes a reading member that reads an original, a discharge tray provided so as to be openable/closeable relative to the apparatus body portion, the discharge tray, by being open, receiving the original discharged from the apparatus body portion, and a control portion that controls supplying of electric power in the apparatus body portion. In the image reading apparatus, the control portion is configured to switch between a first power supplying mode that is a power supplying mode when the reading member reads the original, and a second power supplying mode that is a power supplying mode in which consumption of electric power is smaller than that of the first power supplying mode and that is a power supplying mode while the apparatus body portion is not in use, and is configured to, in a case in which the apparatus body portion is in the second power supplying mode, make a transition to the first power supplying mode when the discharge tray in a closed state is opened.

According to the present aspect, in a case in which the apparatus body portion is in the second power supplying mode, when the discharge tray in the closed state is opened, the control portion makes the transition to the first power supplying mode; accordingly, the user does not have to perform an operation pertaining to the power source after opening the discharge tray and the usability of the apparatus is improved.

Hereinafter, the present disclosure will be described in detail.

Note that in the present specification, a power supplying mode is a term used to describe the difference in the states in which the power is consumed. For example, a state in which no electric power is supplied to any of the components, in other words, a state in which the consumption of electric power is zero is also regarded as one of the power supplying modes.

Hereinafter, a scanner 1 configured to read at least one surface among a front surface and a back surface of an original will be exemplified as an example of the image reading apparatus. The scanner 1 is a so-called document scanner that preforms reading while moving an original relative to a reading member.

Note that in the X-Y-Z coordinate system depicted in each of the drawings, the X-axis direction is an apparatus width direction and is an original width direction. The Y-axis direction is an apparatus depth direction and is a direction extending in the horizontal direction. The Z-axis direction is a direction that extends in a vertical direction. Furthermore, the V-axis direction is a direction that is parallel to original transport paths T, T1, T2, and T3, and the angle formed with the Y-axis direction, in particular, changes depending on the position of the apparatus.

In the present exemplary embodiment, the +Y direction is a direction extending from an apparatus rear surface towards an apparatus front surface, and the −Y direction is a direction extending from the apparatus front surface towards the apparatus rear surface. Furthermore, when viewed from the apparatus front surface, the left is the +X direction and the right is the −X direction.

Furthermore, hereinafter, a direction in which the original is transported (the +V direction) may be referred to as "downstream", and a direction opposite the above (the −V direction) may be referred to as "upstream".

Referring to FIGS. 1 to 5, the scanner 1 includes an apparatus body portion 2, and a support portion 5 that rotatably supports the apparatus body portion 2.

The apparatus body portion 2 includes a lower unit 3 and an upper unit 4.

The upper unit 4 is provided so as to be opened/closed by rotating, relative to the lower unit 3, about a rotation shaft (not shown). By being opened towards the apparatus front side, the upper unit 4 can expose an original transport path described later.

The lower unit 3 that constitutes the apparatus body portion 2 is provided so as to be, relative to an arm portion 5a constituting the support portion 5, rotatable about a rotation shaft 5b. The lower unit 3 is configured to change its position by rotation thereof.

Figure 3:
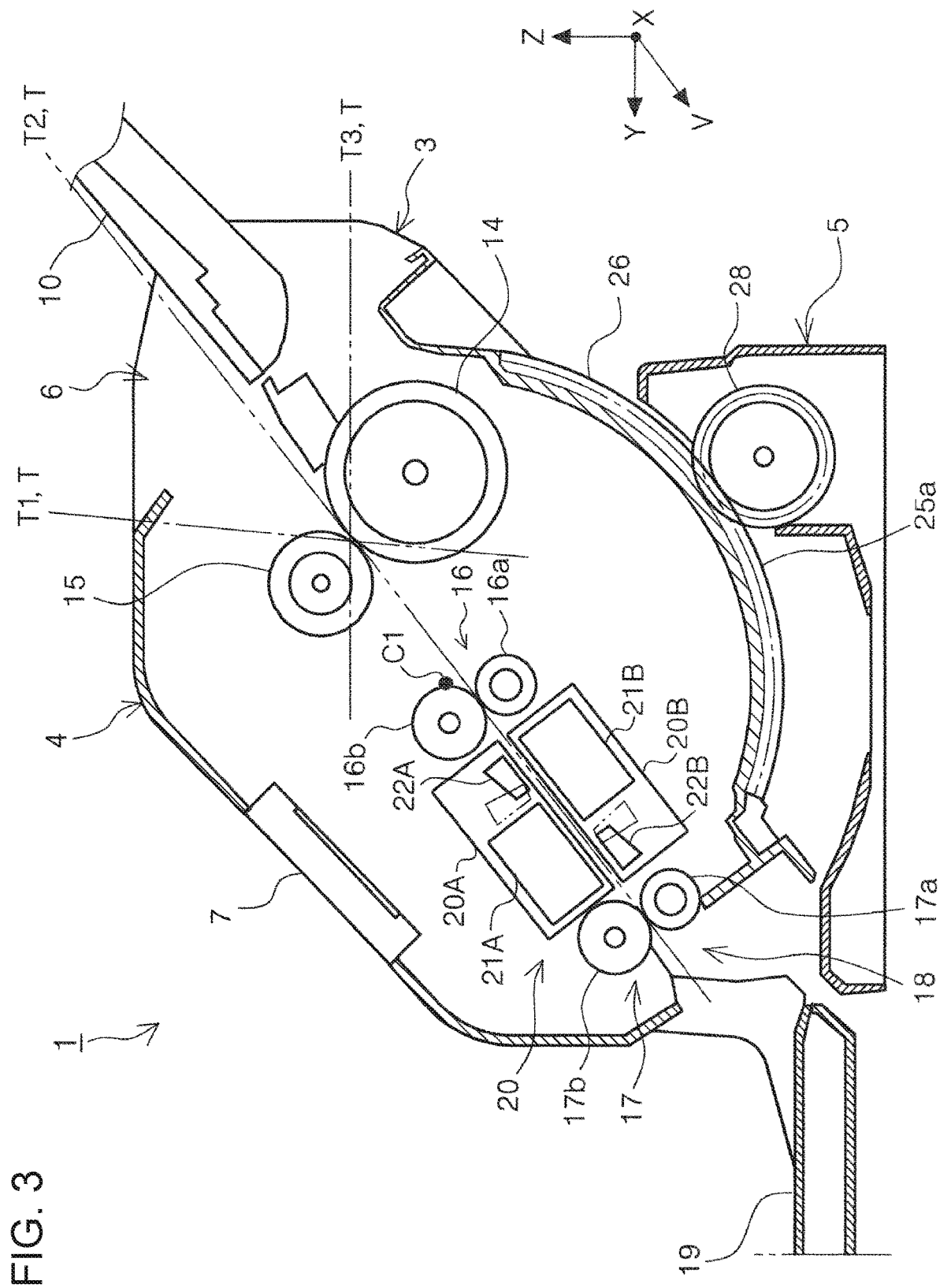
FIG. 3 is a cross-sectional view viewing, in a width direction, an original transport path of the apparatus body portion in the second position.
Figure 5:
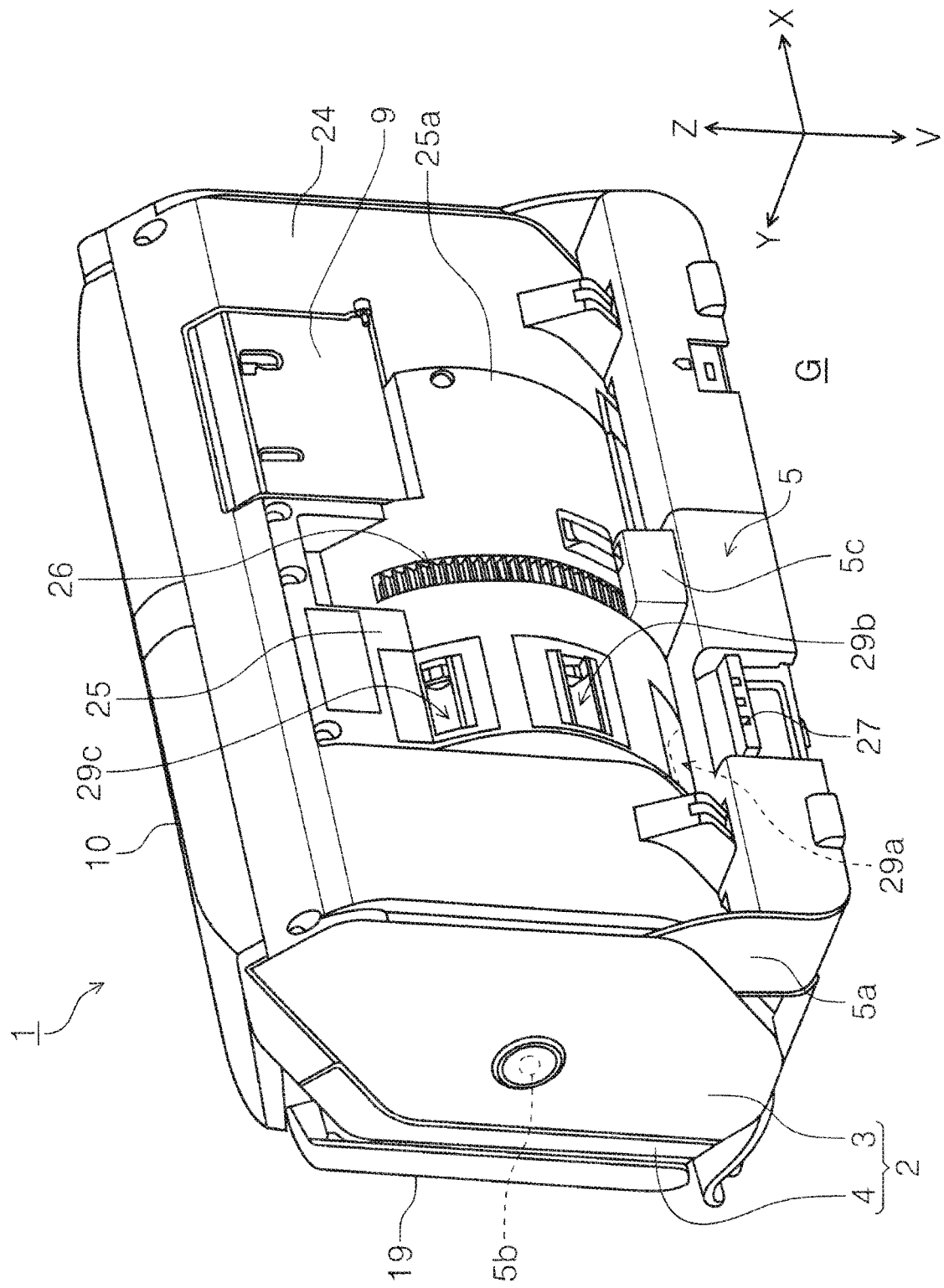
FIG. 5 is an external perspective view viewing the apparatus body portion in a first position from the back.

As illustrated in FIG. 5, an outer shell of the lower unit 3 is configured of a first housing 24 and a second housing 25. The second housing 25 includes an arch portion 25a shaped along a rotational locus of the lower unit 3. The arch portion 25a is provided with a rack portion 26. As illustrated in FIG. 3, the rack portion 26 is engaged with a pinion gear 28 provided in the support portion 5.

A rotational load is applied to the pinion gear 28 with a damper mechanism (not shown). The damper mechanism attenuates the rotating speed of the lower unit 3 when the lower unit 3 is rotated, in other words, when the position of the apparatus body portion 2 is changed.

Figure 4:
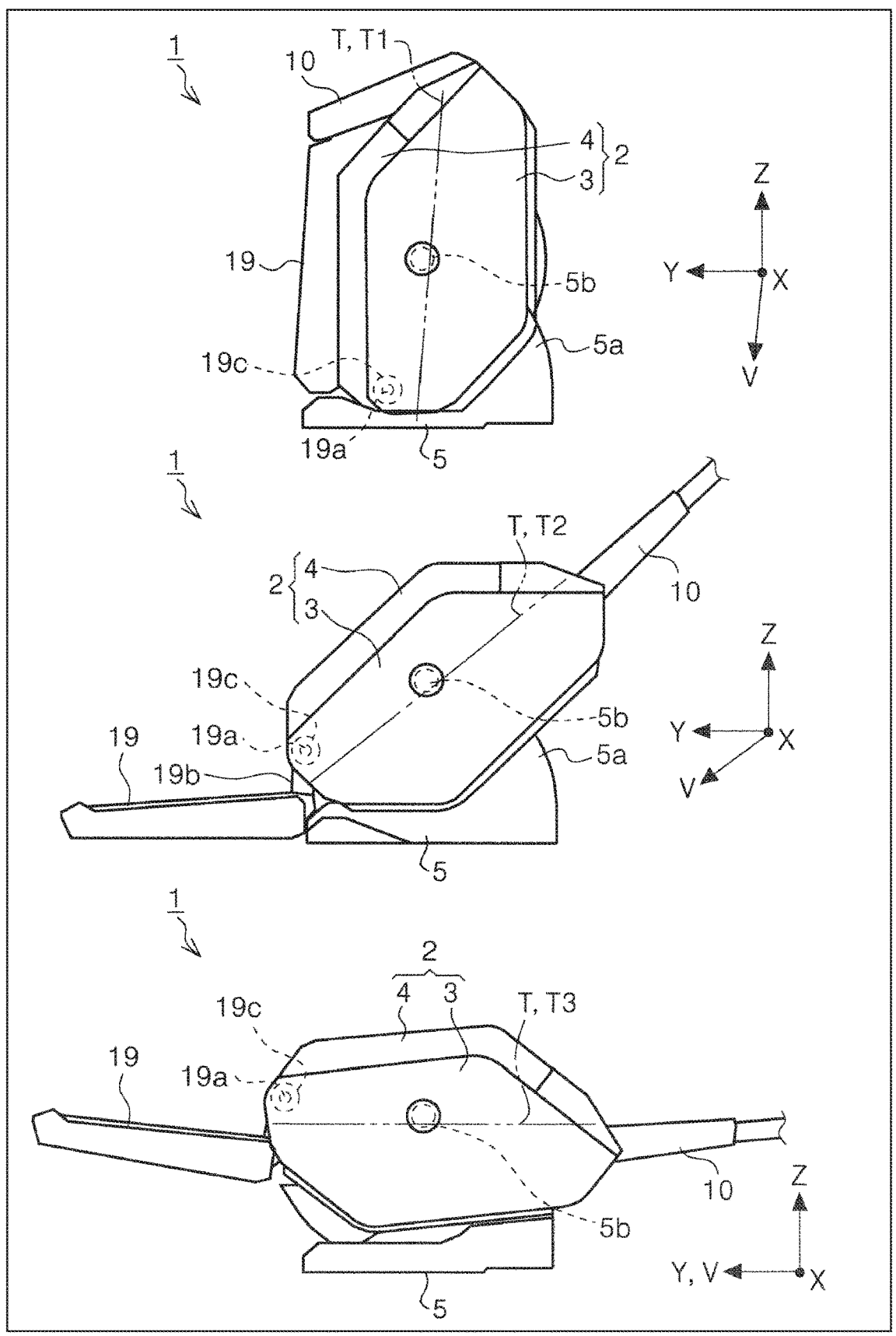
FIG. 4 illustrates variations in positions of the apparatus body portion.

The apparatus body portion 2 of the scanner 1 according to the present exemplary embodiment is configured to maintain three positions with a position maintaining member described later. Among the three positions, two positions are taken while reading an original, and the remaining one is taken while not in use. The position illustrated in FIGS. 2 and 3 and at the middle and the bottom of FIG. 4 are positions taken while reading an original. The position taken in FIGS. 2 and 3 and at the middle of FIG. 4 is a second position and the position illustrated at the bottom of FIG. 4 is a third position. Furthermore, the position illustrated in FIG. 5 and at the top of FIG. 4 is a position taken while not in use and is a first position. In the first position, the projected area of the scanner 1 on a mount surface G becomes the smallest. More specifically, in the first position, the apparatus body portion 2 takes a position in which the occupied space in the Y-axis direction is the smallest. In the second position, the projected area is larger than that of the first position, and in the third position, the projected area is larger than that of the second position.

Hereinafter, for convenience sake, the first position illustrated at the top in FIG. 4 is referred to as a "storage position", the second position illustrated at the middle in FIG. 4 is referred to as a "normal position", and the third position illustrated at the bottom in FIG. 4 is referred to as a "horizontal position".

The upper unit 4 includes a front cover 19, and the lower unit 3 includes an upper cover 10. The front cover 19 is provided so as to be, relative to the upper unit 4, rotatable about a rotation shaft 19a (see FIG. 4), and is capable of taking a closed state illustrated in FIG. 1 and at the top of FIG. 4 and an open state illustrated in FIGS. 2 and 3 and at the middle and the bottom of FIG. 4 with the rotation thereof. When the apparatus body portion 2 is in the normal position, the user can open the closed front cover 19 by applying external force thereto oriented towards the user in an oblique upward direction, or in both directions in the +Z direction and the +Y direction. A rotation direction when opening the front cover 19 (a counterclockwise direction in FIG. 4) is opposite a rotation direction when opening the upper cover 10 (a clockwise direction in FIG. 4). Furthermore, the rotation direction when opening the front cover 19 is opposite a rotation direction of the apparatus body portion 2 (the clockwise direction in FIG. 4) when the position of the apparatus body portion 2 is changed from the storage position towards the normal position.

The front cover 19 functions as an original receiving tray that, by being opened, receives an original on which reading has been performed and which has been discharged thereon.

Note that a damper 19c (see FIG. 4) serving as an attenuating member is provided in the rotation shaft 19a of the front cover 19. The rotation of the front cover 19 in the opening direction is attenuated by the damper 19c. Noise, damage, and the like due to vigorously opening the front cover 19 can be suppressed with the above.

Note that opening/closing of the front cover 19 will be described further in detail later.

Figure 2:
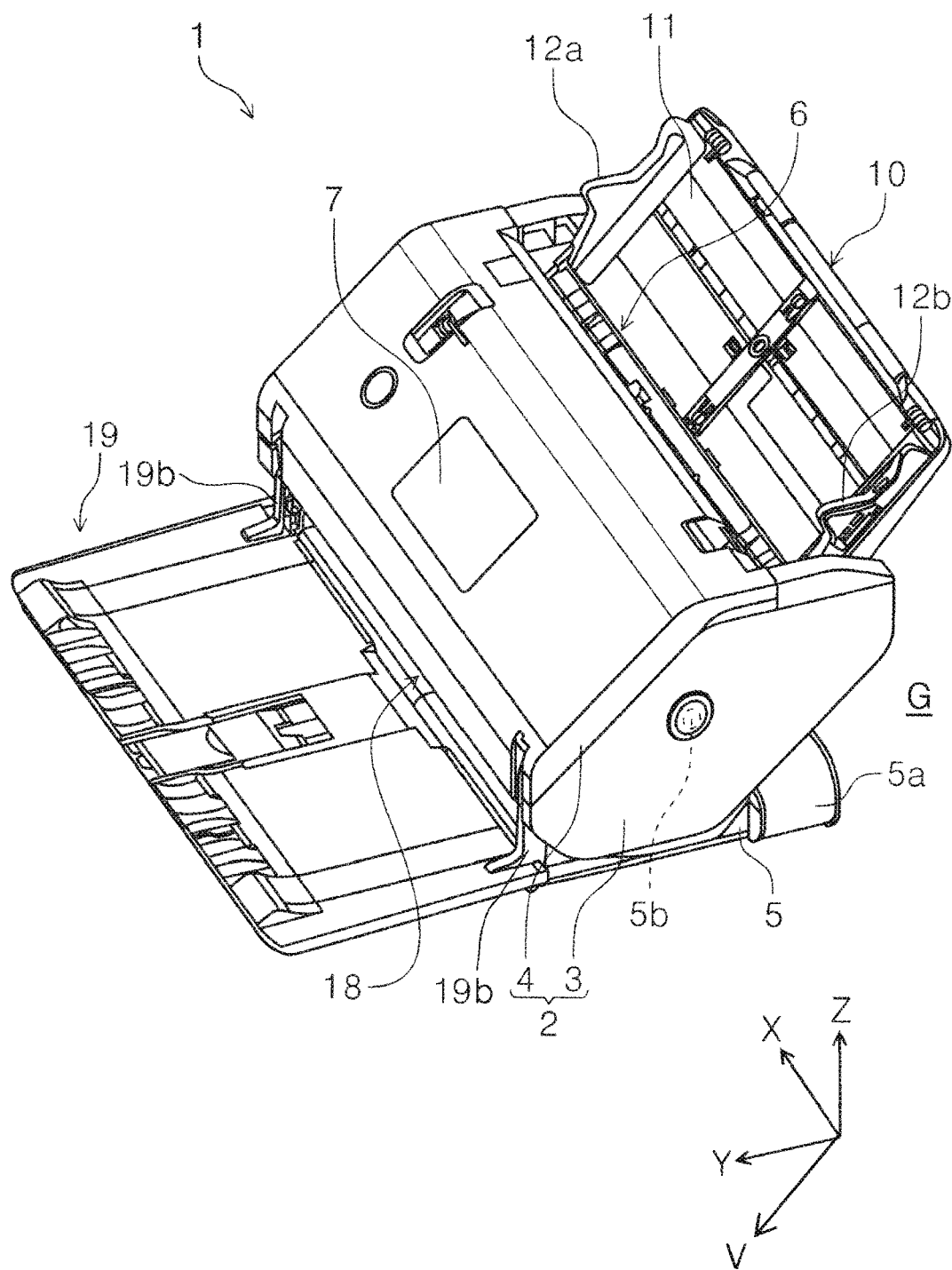
FIG. 2 is an external perspective view viewing the apparatus body portion in the second position from the front.

The upper unit 4 includes, as illustrated in FIG. 2, an operation panel 7 at an upper surface thereof. The operation panel 7 is implemented as a user interface (UI) in which various read settings and an execution of a reading operation are input and in which reading settings and the like are displayed. The operation panel 7 in the present exemplary embodiment is a so-called touch panel on which both display and input can be performed, and serves both as an operation portion for performing various operations and a display portion for displaying various pieces of information. The operation panel 7 is exposed by opening the front cover 19.

The upper cover 10 provided in the lower unit 3 is provided so as to be rotatable relative to the lower unit 3, and is capable of taking the closed state illustrated in FIG. 1, at the top of FIG. 4, and in FIG. 5, and the open state illustrated in FIGS. 2 and 3 and at the middle and the bottom of FIG. 4 with the rotation thereof. When the apparatus body portion 2 is in the normal position, the user can open the closed upper cover 10 by applying external force to the upper cover 10 in the +Z direction. The rotation direction when opening the upper cover 10 (the clockwise direction in FIG. 4) is the same as the rotation direction of the apparatus body portion 2 (the clockwise direction in FIG. 4) when the position of the apparatus body portion 2 is changed from the storage position towards the normal position.

Furthermore, by being opened, the upper cover 10 functions as an original support tray that supports the fed original. In FIG. 2, reference numerals 12a and 12b are edge guides that guide the side edges of the original.

A feed port 6 continuous to the inside of the apparatus body portion 2 is provided on an upper portion of the apparatus body portion 2. The original mounted on the upper cover 10 is sent towards the inside of the apparatus body portion 2 through the feed port 6.

Note that in the present exemplary embodiment, an area of the front cover 19 is larger than an area of the upper cover 10. In other words, an area in which the front cover 19 covers the apparatus body portion 2 is larger than an area in which the upper cover 10 covers the apparatus body portion 2. Note that it goes without saying the opposite of the above is also suffice.

Referring mainly to FIG. 3, the original transport path in the scanner 1 will be described next. In FIG. 3, the original transport path T2 (also see the drawing in the middle of FIG. 4) is the original transport path when the apparatus body portion 2 is in the normal position. On the other hand, the original transport path T1 (also see the drawing at the top of FIG. 4) depicts a portion of the original transport path when the apparatus body portion 2 is in the storage position. Furthermore, the original transport path T3 (also see the drawing at the bottom of FIG. 4) depicts a portion of the original transport path when the apparatus body portion 2 is in the horizontal position.

The original transport path T becomes closer to vertical (the original transport path T1) when in the storage position, forms an inclination of about 45° (the original transport path T2) when in the normal position, and is in a substantially horizontal state (the original transport path T3) when in the horizontal position.

Hereinafter, when there is no particular need to distinguish between the original transport paths T1, T2, and T3, the original transport path will be referred to as the original transport path T.

The original transport path T is a substantially linear original transport path formed between the lower unit 3 and the upper unit 4.

The upper cover 10 described above is provided at a most upstream portion in the original transport path T, and feed rollers 14 that send the originals mounted on the upper cover 10 downstream and separating rollers 15 that nip and separate the originals with the feed rollers 14 are provided downstream of the upper cover 10. The feed rollers 14 come in contact with, among the originals mounted on the upper cover 10, the original at the bottom. Accordingly, when a plurality of originals are mounted on the upper cover 10, the originals are sequentially fed downstream from the original at the bottom.

The feed rollers 14 receiving rotational torque from a feed motor 57 (see FIG. 8) rotates in the counterclockwise direction in FIG. 3.

Rotational torque that rotates in the counterclockwise direction in FIG. 3 is transmitted from a separating motor 56 (see FIG. 8) to the separating rollers 15 through a torque limiter (not shown).

Figure 8:
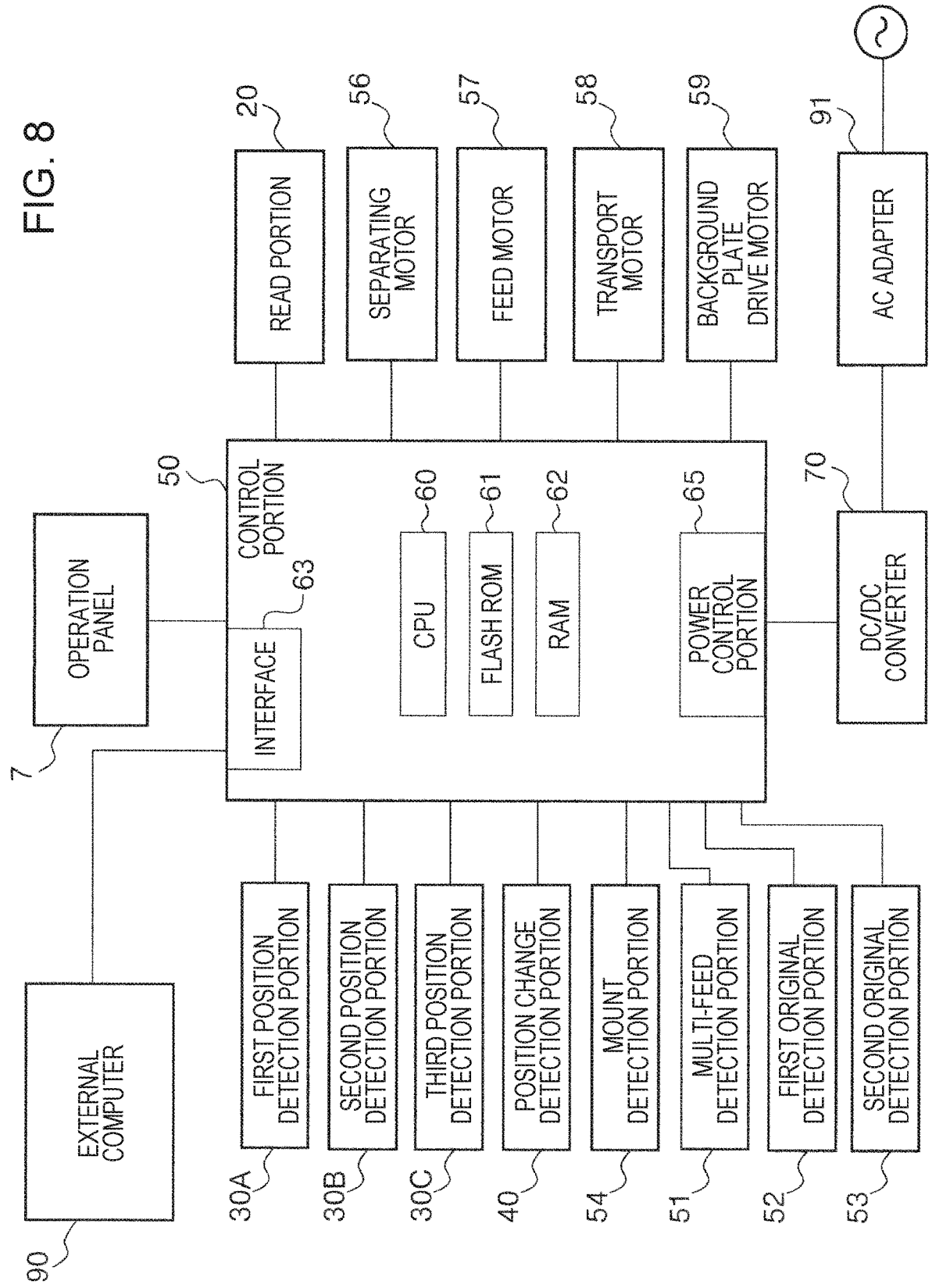
FIG. 8 is a block diagram of a control system.

When no original is interposed between the feed rollers 14 and the separating rollers 15 or when there is a single piece of original interposed in between, due to the sliding caused by a torque limiter (not shown), the separating rollers 15 are driven and rotated in the clockwise direction in FIG. 3 with the rotation of the feed rollers 14 regardless of the rotational torque from the separating motor 56 (see FIG. 8).

Furthermore, in addition to the original that is to be fed, when the second original or the second original and after enter between the feed rollers 14 and the separating rollers 15, since sliding occurs between the originals, the separating rollers 15 rotate in the counterclockwise direction in FIG. 3 due to the rotational torque from the separating motor 56 (see FIG. 8). With the above, multi feeding of the originals is prevented.

A pair of transport rollers 16, a reading portion 20 serving as the reading member that reads an image of an original, and a pair of discharge rollers 17 are provided downstream of the feed rollers 14. The pair of transport rollers 16 includes a transport driving roller 16a that is rotated and driven by a transport motor 58 (see FIG. 8), and a transport driven roller 16b that is driven and rotated.

The original that is nipped between the feed rollers 14 and the separating rollers 15 and that is fed downstream is nipped between the pair of transport rollers 16 and is transported to a position opposing an upper sensor unit 20A and a lower sensor unit 20B located downstream of the pair of transport rollers 16.

The reading portion 20 includes the upper sensor unit 20A that is positioned above the original transport path T and that is provided in the upper unit 4, and the lower sensor unit 20B that is positioned below the original transport path T and that is provided in the lower unit 3. The upper sensor unit 20A includes a sensor module 21A, and the lower sensor unit 20B includes a sensor module 21B. In the present exemplary embodiment, the sensor modules 21A and 21B are contact image sensor modules (CISMs).

An upper surface of the original is read by the sensor module 21A positioned above the original transport path T, and an under surface of the original is read by the sensor module 21B positioned below the original transport path T.

Note that an original reading surface (not shown) read by the upper sensor unit 20A, and an original reading surface (not shown) read by the lower sensor unit 20B are surfaces parallel to the original transport path T.

The upper sensor unit 20A includes a background plate 22A at a position that opposes the sensor module 21B included in the lower sensor unit 20B, and the lower sensor unit 20B includes a background plate 22B at a position that opposes the sensor module 21A included in the upper sensor unit 20A.

The background plates 22A and 22B are reference plates that are read by opposing sensor modules to perform shading compensation and, for example, resin plates of a white color, a gray color, a black color, or the like or metal plates of a white color, a gray color, a black color, or the like can be used.

The background plates 22A and 22B are provided so as to be rotatable by motive power of a background plate drive motor 59 (see FIG. 8) and by rotating, the background plates 22A and 22B can switch between an opposing state illustrated by a solid line in which the background plates 22A and 22B oppose the sensor modules, and a non-opposing state illustrated by a two-dot chain line in which the opposing state is canceled. The background plates 22A and 22B are, for example, formed white. When in the opposing state, a white reference value can be obtained and when in the non-opposing state, a black reference value can be obtained.

After an image on at least one of the upper surface and the under surface of the original has been read in the reading portion 20, the original is nipped between the pair of discharge rollers 17 positioned downstream of the reading portion 20 and is discharged through a discharge port 18.

The pair of discharge rollers 17 include a discharge driving roller 17a rotated and driven by the transport motor 58 (see FIG. 8), and a discharge driven roller 17b that is driven and rotated.

Referring next to FIG. 8, a control system of the scanner 1 will be described.

A control portion 50 performs various controls related to the scanner 1 including controls related to feeding, transporting, and discharging the original and control related to reading the original. Signals from an operation panel 7 is input to the control portion 50. Signals to display the operation panel 7, in particular, signals to provide a user interface (UI) are transmitted from the control portion 50 to the operation panel 7.

The control portion 50 controls the motors such as the separating motor 56, the feed motor 57, the transport motor 58, and the background plate drive motor 59. In the present exemplary embodiment, each of the motors is a DC motor.

Read data from the reading portion 20 is input to the control portion 50, and a signal to control the reading portion 20 is transmitted from the control portion 50 to the reading portion 20.

Signals from detection portions such as a mount detection portion 54, a multi-feed detection portion 51, a first original detection portion 52, a second original detection portion 53, a first position detection portion 30A, a second position detection portion 30B, a third position detection portion 30C, and a position change detection portion 40 are also input to the control portion 50.

Furthermore, detection values of an encoder (not shown) that detects the rotation amounts of the transport driving roller 16a and the discharge driving roller 17a is input to the control portion 50, which allows the control portion 50 to detect the amount at which the original is transported by each roller.

The control portion 50 includes a CPU 60, a flash ROM 61, and a RAM 62. The CPU 60 performs various arithmetic processing according to the program stored in the flash ROM 61 to control the operation of the entire scanner 1. The flash ROM 61, which is an example of a storage member, is a non-volatile memory that can be read and written. Furthermore, various pieces of setting information input by the user through the operation panel 7 are stored in the flash ROM 61 as well. Various pieces of information are temporarily stored in the RAM 61 that is an example of the storage member.

A rear cover 9 (see FIG. 5) is provided on the rear surface of the apparatus body portion 2 in an openable/closeable manner. By opening the rear cover 9, a power plug coupling portion (not shown) and an interface connector coupling portion (not shown) become exposed. The interface connector coupling portion constitutes an interface 63. The scanner 1 is configured to communicate with an external computer 90 through the interface 63. An example of the interface 63 includes a universal serial bus (USB) interface.

Furthermore, the scanner 1 receives electric power from a commercial power source through a DC/DC converter 70 by coupling a power plug of an AC adapter 91 external to the apparatus to the power plug coupling portion. The electric power supplied through the DC/DC converter 70 is adjusted to a voltage suitable for each member with an electric power control portion 65 and is supplied to each member. Under the control of the CPU 60, the electric power control portion 65 switches between supplying and shutting off the electric power to each of the members of the apparatus.

Detection portions provided in the original transport path T will be described next.

The mount detection portion 54 is a detection portion provided upstream of the feed rollers 14 (see FIG. 3). The control portion 50 can detect whether there is an original on the upper cover 10 through a signal transmitted from the mount detection portion 54.

The first original detection portion 52 is a detection portion provided between the feed rollers 14 (see FIG. 3) and the pair of transport rollers 16 (see FIG. 3). The control portion 50 can detect the passage of the front end or the rear end of the original through a signal transmitted from the first original detection portion 52.

The multi-feed detection portion 51 is a detection portion provided between the feed rollers 14 (see FIG. 3) and the pair of transport rollers 16 (see FIG. 3), and is formed of an ultrasonic transmitting portion and an ultrasonic receiving portion that are disposed so as to oppose each other with the original transport path T interposed in between. The control portion 50 detects multi-feeding of the original through a signal transmitted from the multi-feed detection portion 51.

The second original detection portion 53 is a detection portion provided between the pair of transport rollers 16 (see FIG. 3) and the reading portion 20 (see FIG. 3). The control portion 50 can detect the passage of the front end or the rear end of the original through a signal transmitted from the second original detection portion 53.

The position maintaining member that maintains the position of the apparatus body portion 2 will be described next. The position maintaining member includes recessed portions such as a first recessed portion 29a, a second recessed portion 29b, and a third recessed portion 29c illustrated in FIG. 5, and an advancing/retreating unit 8 illustrated in FIG. 7.

The recessed portions such as the first recessed portion 29a, the second recessed portion 29b, and the third recessed portion 29c illustrated in FIG. 5 are provided at intervals in a circumferential direction of the arch portion 25a of the second housing 25.

Figure 7:
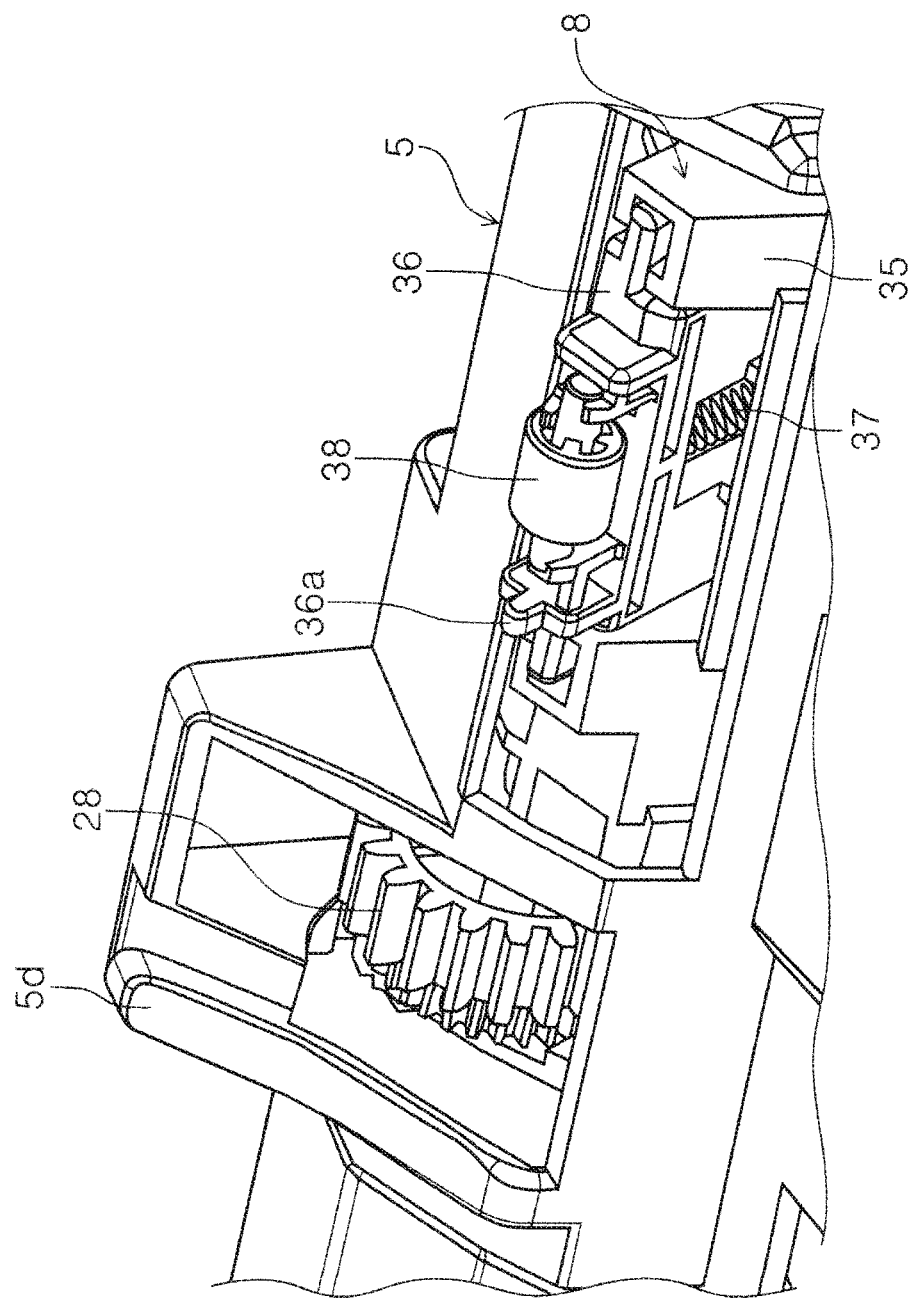
FIG. 7 is a perspective view of an advancing/retreating unit.

The advancing/retreating unit 8 illustrated in FIG. 7 includes a base portion 35, a slider unit 36 that is provided in the base portion 35 so as to displaceable, relative to the arch portion 25a, in an advancing/retreating direction, a spring 37 that pushes the slider unit 36 towards the arch portion 25a, and an operating lever 27 (see FIG. 5) that counters the spring force of the spring 37 and that retreats the slider unit 36 from the arch portion 25a.

The slider unit 36 is provided with a driven roller 38. The driven roller 38 is a roller capable of free rotation. The driven roller 38 is in contact with the front surface of the arch portion 25a illustrated in FIG. 5 and is driven and rotated when the position of the apparatus body portion 2 is changed. Furthermore, the position of the apparatus body portion 2 is maintained by having a front end portion of the slider unit 36 including the driven roller 38 enter the first recessed portion 29a, the second recessed portion 29b, or the third recessed portion 29c.

More specifically, the apparatus body portion 2 is maintained in the storage position by having the slider unit 36 enter the recessed portion 29a in FIG. 5, the apparatus body portion 2 is maintained in the normal position by having the slider unit 36 enter the recessed portion 29b in FIG. 5, and the apparatus body portion 2 is maintained in the horizontal position by having the slider unit 36 enter the recessed portion 29c in FIG. 5.

The operating lever 27 in FIG. 5 is operated when releasing the position maintained state of the apparatus body portion 2. With the above, the slider unit 36 is lowered, in other words, the slider unit 36 retreats from each recessed portion, which allows the position of the apparatus body portion 2 to be changed.

Figure 6:
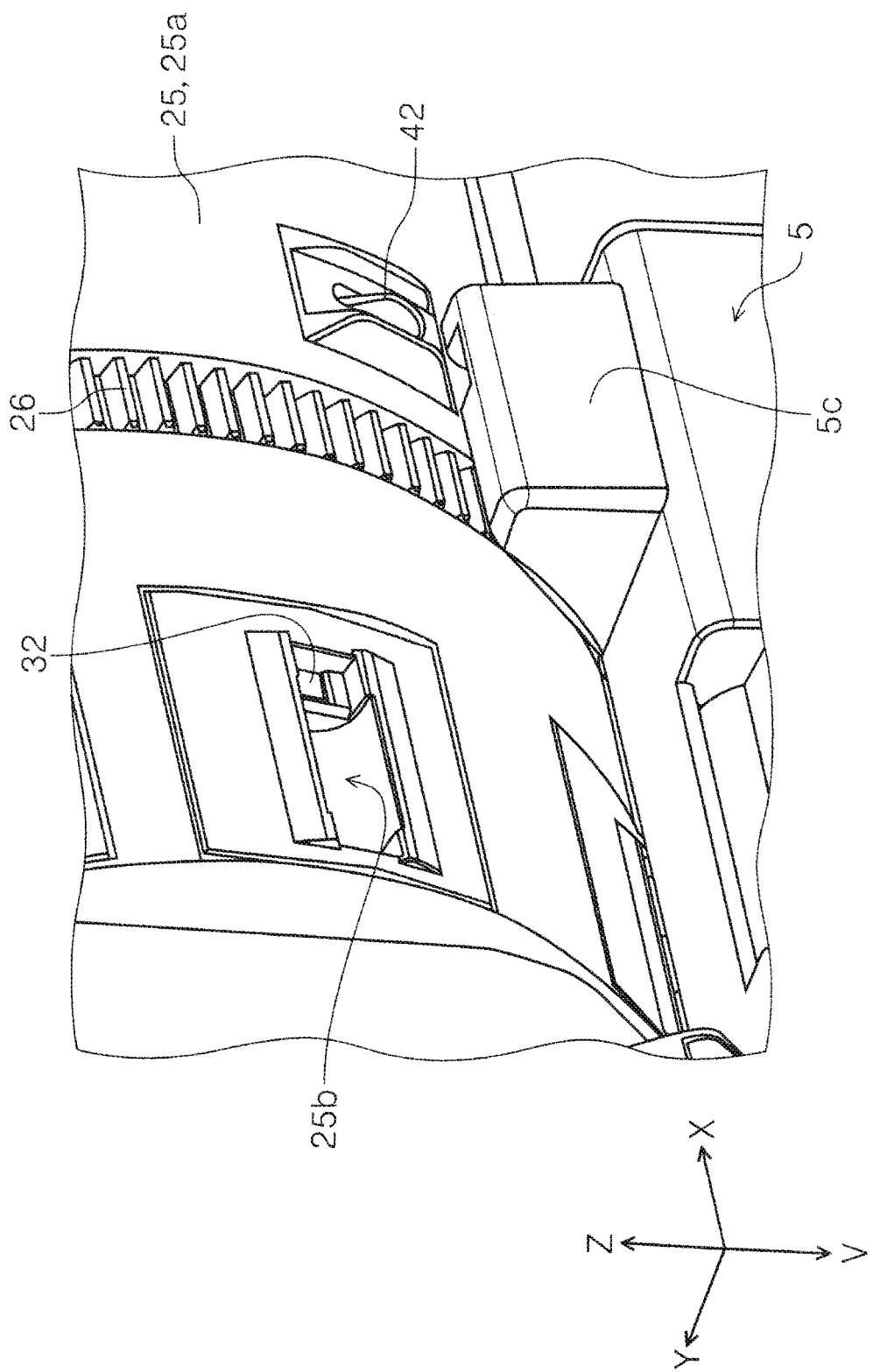
FIG. 6 is a partial and enlarged perspective view of FIG. 4.

Note that as illustrated in FIG. 6, a portion of a lever 32 in each recessed portion is exposed, which will be described later.

The detection portions, namely, the first position detection portion 30A, the second position detection portion 30B, the third position detection portion 30C, and the position change detection portion 40 will be described next referring to FIGS. 6, 7, and 9 to 12.

As illustrated in FIGS. 9 to 12, the detection portions, namely, the first position detection portion 30A, the second position detection portion 30B, and the third position detection portion 30C are provided in the apparatus body portion 2 at intervals in the circumferential direction of the arch portion 25a.

Each detection portion includes the lever 32 that is pivotable, and a detection portion 31 that detects the change in the position of the lever 32. The lever 32 included in each detection portion is, as illustrated in FIG. 6, provided so that a portion thereof is exposed in the corresponding recessed portion. A protruding portion 36a formed in the base portion 35, which has been described with reference to FIG. 7, is configured to push the lever 32.

Figure 9:
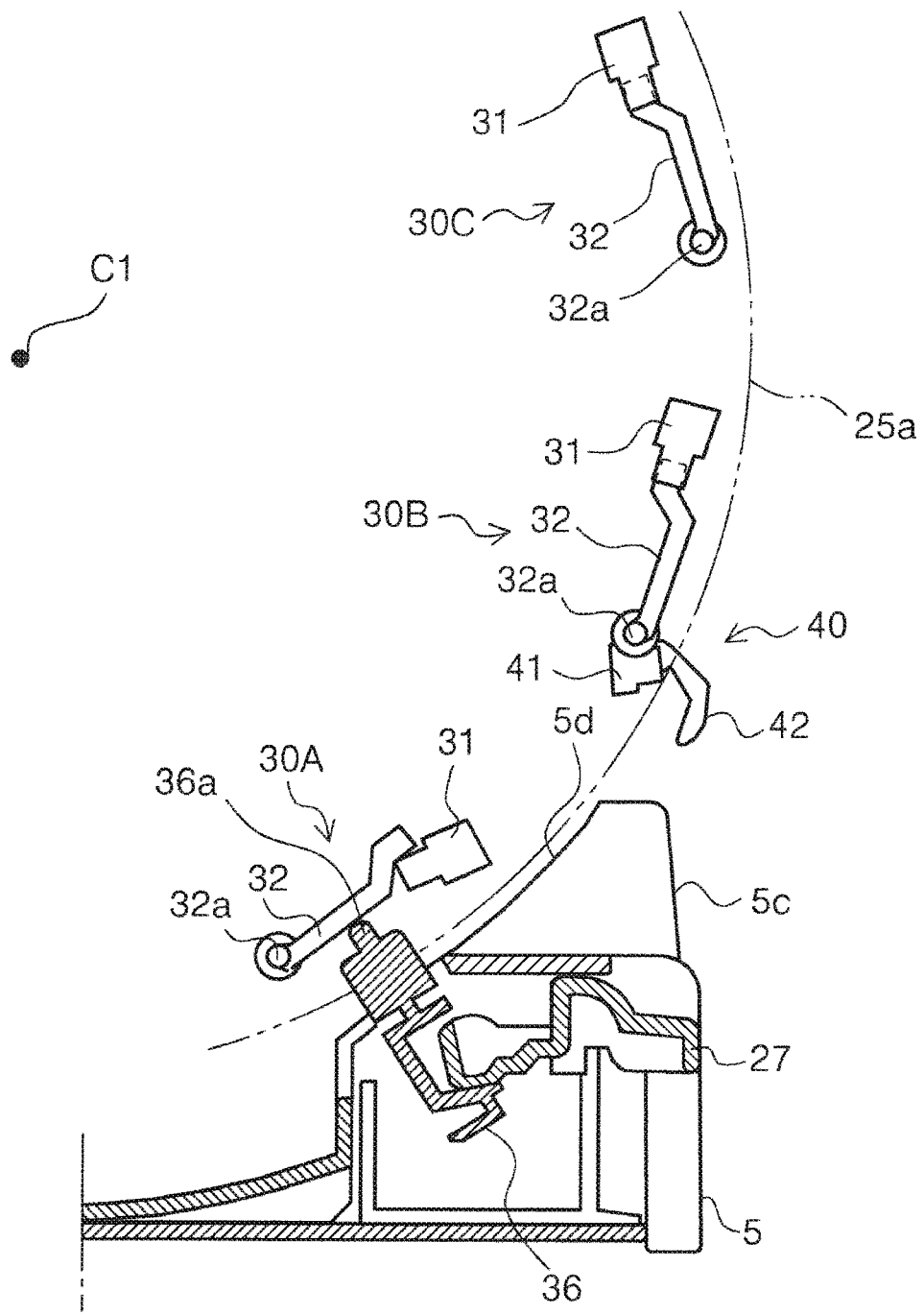
FIG. 9 is a side view of a first position detection portion, a second position detection portion, and a third position detection portion.

Furthermore, when the slider unit 36 illustrated in FIG. 7 enters the first recessed portion 29a illustrated in FIG. 5, the protruding portion 36a pushes the lever 32 constituting the first position detection portion 30A and pivots the lever 32 to detach the lever 32 from the detection portion 31 (see FIG. 9). With the above, the control portion 50 can detect that the apparatus body portion 2 has been switched to the storage position.

Figure 11:
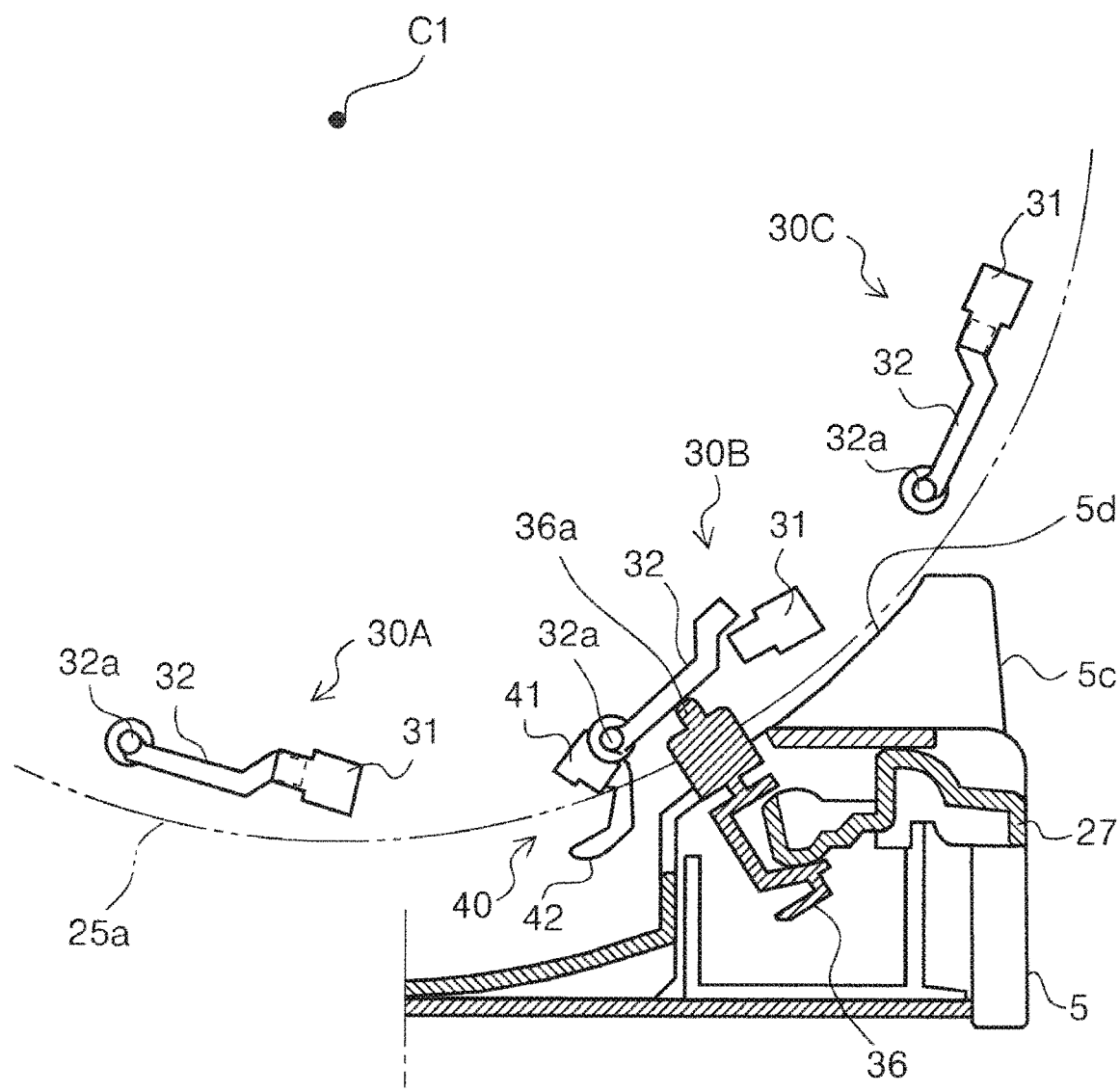
FIG. 11 is a side view of the first position detection portion, the second position detection portion, and the third position detection portion.

In a similar manner, when the slider unit 36 illustrated in FIG. 7 enters the second recessed portion 29b illustrated in FIG. 5, the protruding portion 36a pushes the lever 32 constituting the second position detection portion 30B and pivots the lever 32 to detach the lever 32 from the detection portion 31 (see FIG. 11). With the above, the control portion 50 can detect that the apparatus body portion 2 has been switched to the normal position.

Figure 12:
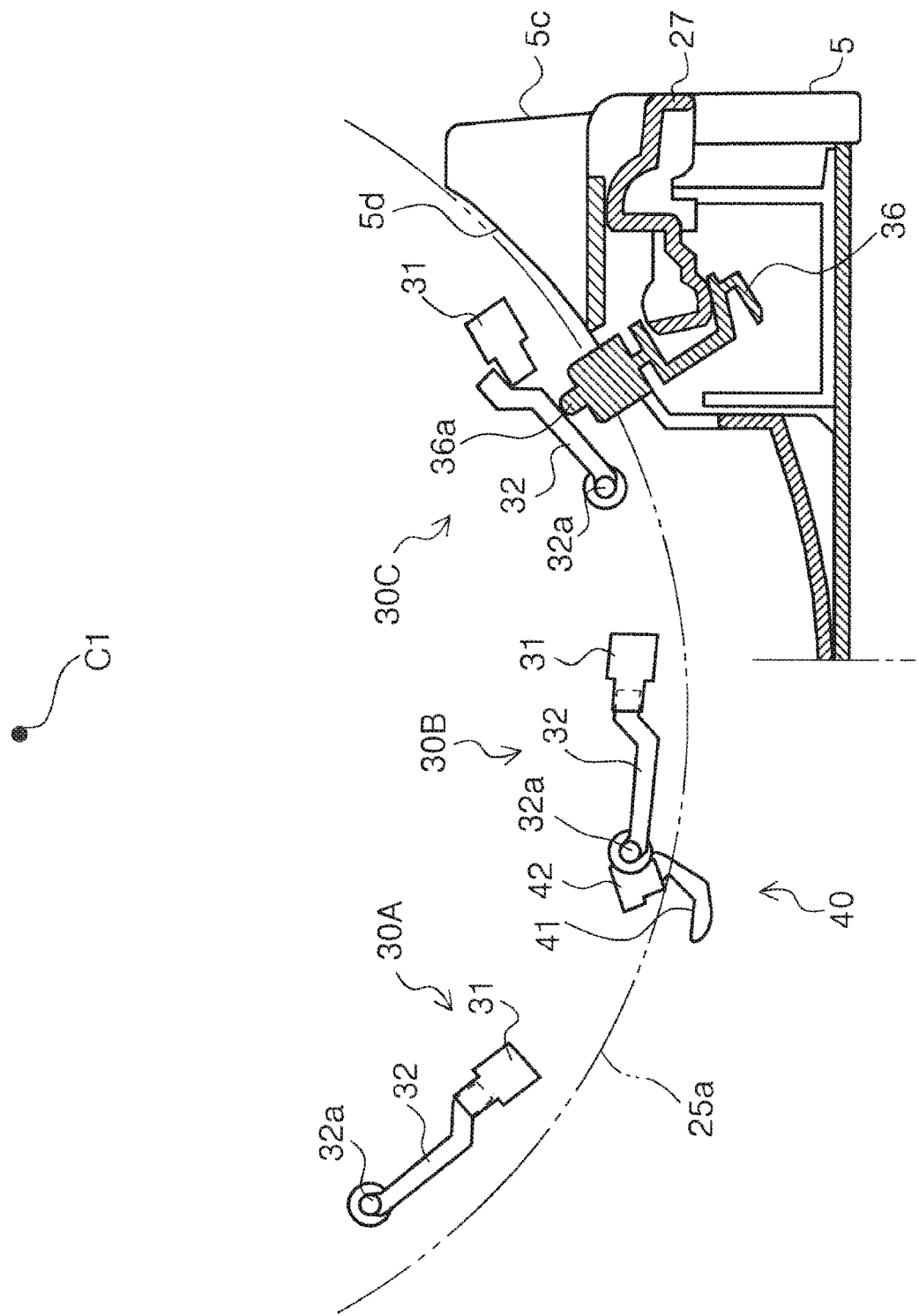
FIG. 12 is a side view of the first position detection portion, the second position detection portion, and the third position detection portion.

In a further similar manner, when the slider unit 36 illustrated in FIG. 7 enters the third recessed portion 29c illustrated in FIG. 5, the protruding portion 36a pushes the lever 32 constituting the third position detection portion 30C and pivots the lever 32 to detach the lever 32 from the detection portion 31 (see FIG. 12). With the above, the control portion 50 can detect that the apparatus body portion 2 has been switched to the horizontal position.

Furthermore, the position change detection portion 40 is provided at a portion of the apparatus body portion 2 near the second position detection portion 30B. The position change detection portion 40 includes a pivotable lever 42, and a detection portion 41 that detects the pivoting of the lever 42. As illustrated in FIG. 6, the lever 42 is provided so as to be capable of protruding to the outer side from the arch portion 25a of the second housing 25.

As illustrated in FIG. 6, the support portion 5 is provided with a projecting portion 5c that projects in the +Z direction. A surface 5d in the projecting portion 5c that opposes the arch portion 25a is, as illustrated in FIGS. 9 to 12, formed as a curved surface. The surface 5d in the projecting portion 5c that opposes the arch portion 25a is, hereinafter, referred to as a sensor contact surface 5d.

The lever 42 is provided at a position allowing the lever 42 to be in contact with the sensor contact surface 5d. As the position of the apparatus body portion 2 changes, the lever 42 is configured to be switched between a state illustrated in FIG. 10 in which the lever 42 is in contact with the sensor contact surface 5d, and a state illustrated in FIGS. 9, 11, and 12 in which the lever 42 is separated from the sensor contact surface 5d.

Figure 10:
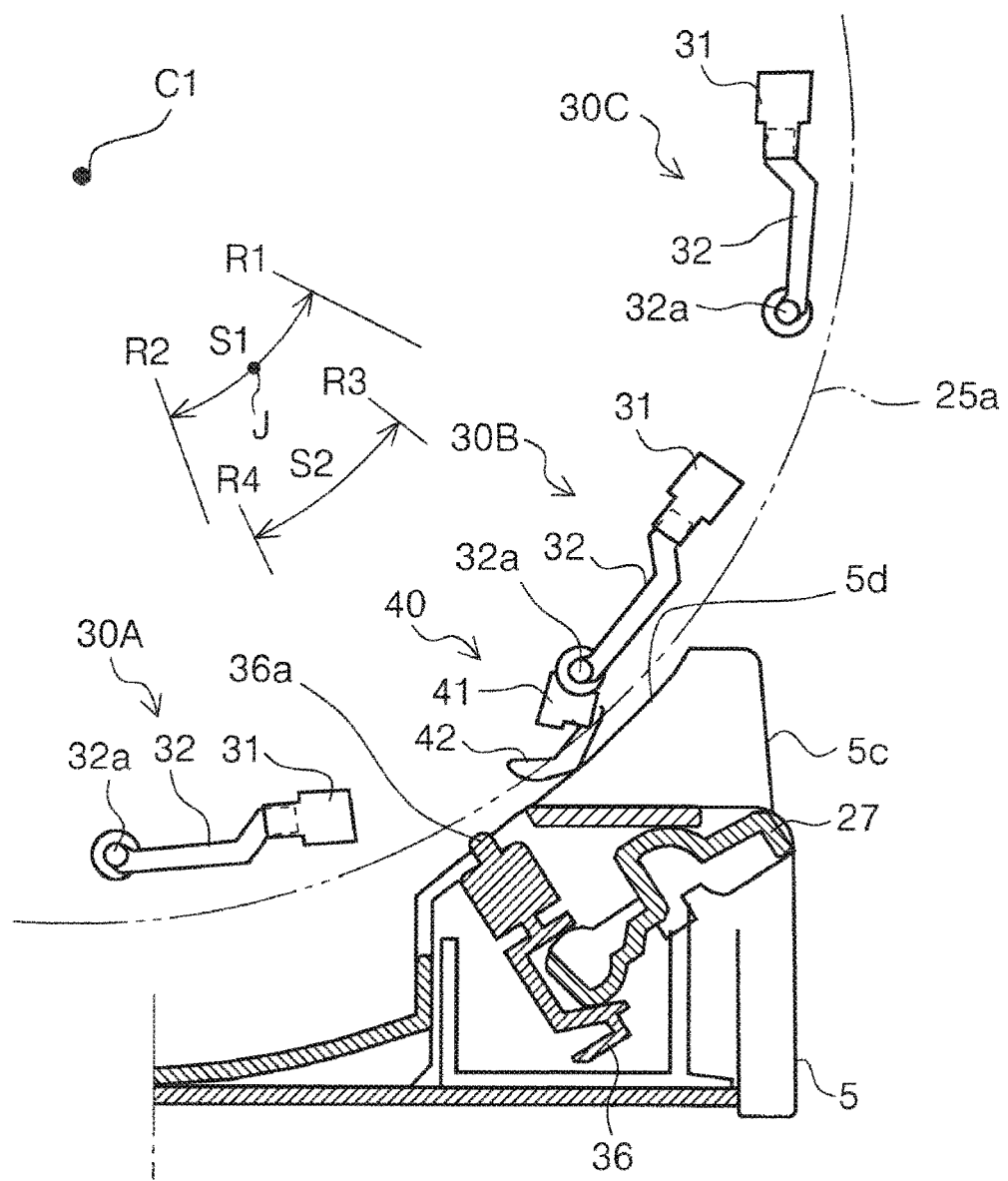
FIG. 10 is a side view of the first position detection portion, the second position detection portion, and the third position detection portion.

In FIG. 10, a range indicated by reference numeral S2 depicts an angular range about a rotation center C1 of the apparatus body portion 2 in which the sensor contact surface 5d is formed, and reference numeral R3 indicates the upper position of the angular range and reference numeral R4 indicates the lower position of the angular range. Furthermore, a section indicated by reference numeral S1 is an angular range in which the lever 42 moves when the apparatus body portion 2 rotates between the storage position and the normal position. Reference numeral R1 indicates the position of the lever 42 when the apparatus body portion 2 is in the storage position (see FIG. 9), and reference numeral R2 indicates the position of the lever 42 when the apparatus body portion 2 is in the normal position (see FIG. 11). Accordingly, the section S1 can be denoted as a section of position change of the apparatus body portion 2 between the first position and the second position.

The range S2 in which the sensor contact surface 5d is formed is contained in the position change section S1, and the position R3 and the position R4, in other words, the positions where the lever 42 pivots are contained in the position change section S1. Among the above positions, the position R3 is set closer to the position R1 with respect to a middle position J of the position change section S1, and the position R4 is set closer to the position R2 with respect to the middle position J of the position change section S1.

The control portion 50 receives, with the position change detection portion 40 including the configurations described above, a change signal of the position change detection portion 40 that is created by pivoting of the lever 42 while the apparatus body portion 2 is switched, for example, from the normal position illustrated in FIG. 11 to the storage position illustrated in FIG. 9, which allows the control portion 50 to detect that the apparatus body portion 2 is in the middle of changing the position from the normal position towards the storage position. Similarly, the control portion 50 receives a change signal of the position change detection portion 40 that is created by pivoting of the lever 42 while the apparatus body portion 2 is switched, for example, from the storage position illustrated in FIG. 9 to the normal position illustrated in FIG. 11, which allows the control portion 50 to detect that the apparatus body portion 2 is in the middle of changing the position from the storage position towards the normal position.

The control portion 50 in the present exemplary embodiment is provided with three power supplying modes, namely, a first power supplying mode, a second power supplying mode, and a third power supplying mode.

The first power supplying mode is a mode in which the power consumption is the largest and is a mode that supplies electric power to each of the portions of the apparatus illustrated in FIG. 8, more specifically, is a mode that supplies electric power to all of the portions that receive supply of electric power. The first power supplying mode is a power supplying mode while the original is read.

The second power supplying mode is a mode in which the power consumption is smaller than that of the first power supplying mode described above, and is a mode in which electric power is supplied only to the position change detection portion 40 among the portions of the apparatus illustrated in FIG. 8.

The third power supplying mode is a mode in which the power consumption is smaller than that of the first power supplying mode described above and is larger than the power consumption of the second power supplying mode. The third power supplying mode supplies electric power to, among the configurations illustrated in FIG. 8, the position change detection portion 40, the mount detection portion 54, the CPU 60, the flash ROM 61, the RAM 62, and the interface 63 and is a mode that does not supply electric power to other configurations.

In the second power supplying mode and the third power supplying mode described above in particular, electric power is not supplied to the first position detection portion 30A, the second position detection portion 30B and the third position detection portion 30C.

Note that control may be performed so that the supply of electric power to the CPU 60, the flash ROM 61, and the RAM 62 in the third power supplying mode is smaller than that in the first power supplying mode.

Figure 13:
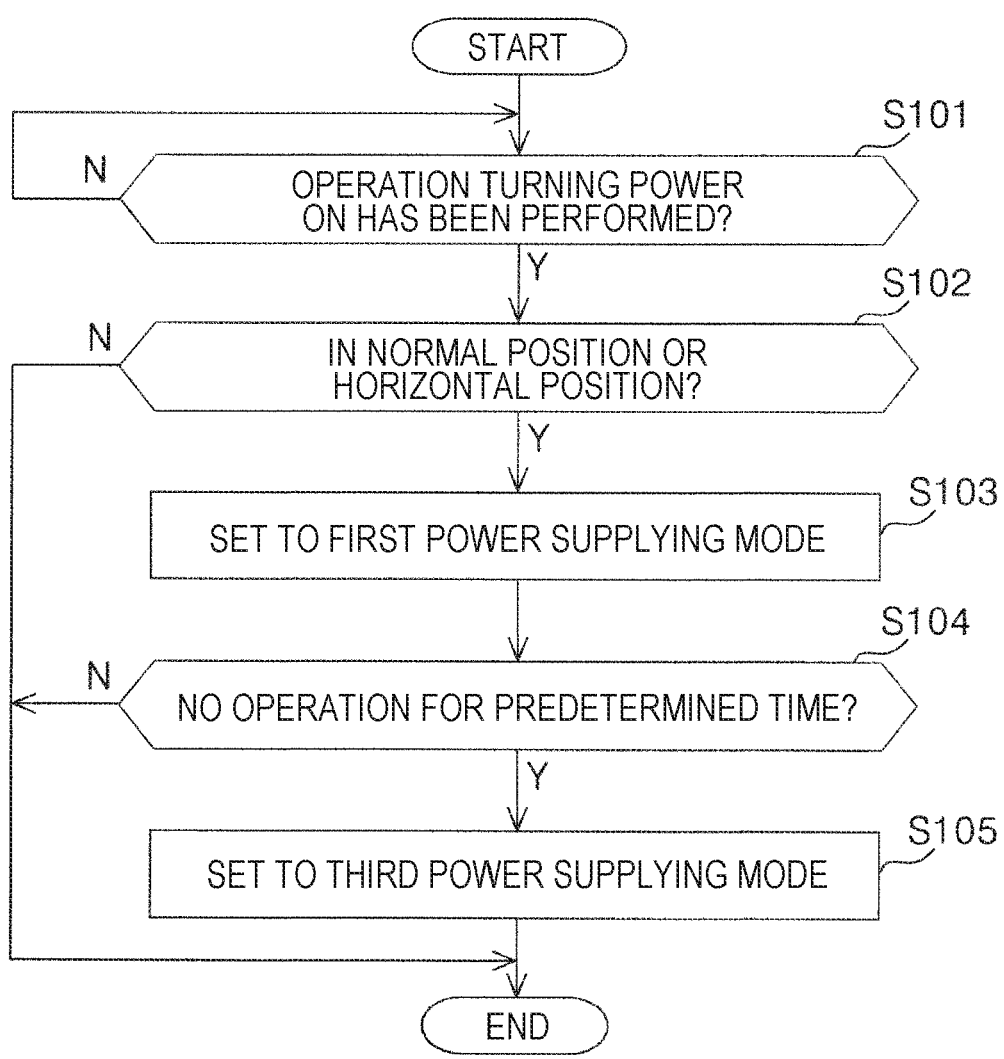
FIG. 13 is a flowchart illustrating a flow of switching a power supplying mode.
Figure 14:
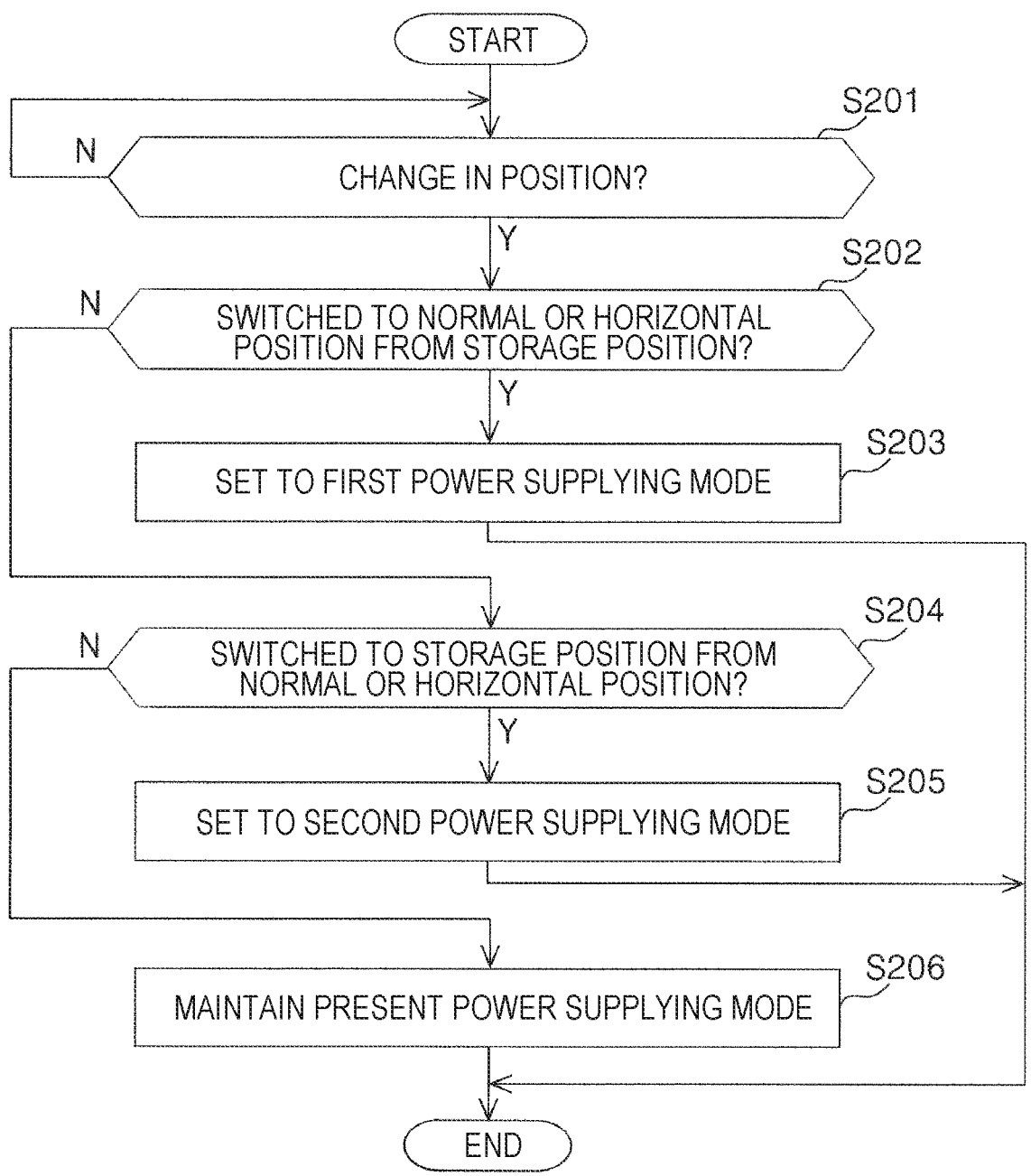
FIG. 14 is a flowchart illustrating a flow of switching the power supplying mode.

Referring hereinafter to FIGS. 13 and 14, switching of the power supplying mode with the control portion 50 will be described. Referring first to FIG. 13, switching of the power supplying mode when there is no change in the position of the apparatus body portion 2 will be described.

In a state in which the power is off, when an operation of turning the power on is performed through the operation panel 7 (step S101), the control portion 50 determines whether the position during the above is the normal position or the horizontal position (step S102), and when in the normal position or in the horizontal position, in other words, when in the position when reading the original (Yes in step S102), the mode is transitioned to the first power supplying mode (step S103). Note that the state in which the power is off is a state in which electric power is not supplied to all the components of the apparatus body portion 2, or may be a state in the second power supplying mode described above.

When No in step S102, in other words, when the operation to turn the power on is performed while in the storage position, the state in which the power is off is maintained.

Subsequently, while in a state in which the first power supplying mode is executed, when there is no operation for a predetermined time (Yes in step S104), the control portion 50 transitions the mode to the third power supplying mode and suppresses power consumption. Note that in addition to the operation panel 7 not being operated for a predetermined time, the interface 63 not receiving any signal from the external computer 90 for a predetermined time may be added to the conditions for transitioning to the third power supplying mode.

Referring next to FIG. 14, switching of the power supplying mode when there is a change in the position of the apparatus body portion 2 will be described.

When the change in the position of the apparatus body portion 2 is detected (Yes in step S201) with the detection signal of the position change detection portion 40, the control portion 50 subsequently determines to which position the position of the apparatus body portion 2 has been changed with the detection signals of the first position detection portion 30A, the second position detection portion 30B, and the third position detection portion 30C. Note that in a case in which the control portion 50 detects the change in position of the apparatus body portion 2 (Yes in step S201), when the power supplying mode during the above is the second power supplying mode or the third power supplying mode, in other words, when the mode is one that does not supply the electric power to the detection portions, namely, the first position detection portion 30A, the second position detection portion 30B, and the third position detection portion 30C, the electric power is supplied to the above detection portions.

Subsequently, when the control portion 50 detects that the position of the apparatus body portion 2 has been switched to the normal position or the horizontal position (Yes in step S202), in other words, when the position of the apparatus body portion 2 has been switched to the position when reading the original, the mode is transitioned to the first power supplying mode (step S203).

Alternatively, when the control portion 50 detects that the position of the apparatus body portion 2 has been switched to the storage position (Yes in step S204), in other words, when detected that the position of the apparatus body portion 2 has been switched to the position when not in use, the mode is transitioned to the second power supplying mode (step S205).

Note that even when the change in the position of the apparatus body portion 2 is detected in step S201, the current power supplying mode is maintained (step S206) unless the change in the position of the apparatus body portion 2 is detected in none of the first position detection portion 30A, the second position detection portion 30B, and the third position detection portion 30C.

As described above, the scanner 1 according to the present exemplary embodiment includes, in addition to the reading portion 20 that is the reading member that reads an original, the apparatus body portion 2 that is provided so as to be capable of changing the position thereof relative to the support portion 5; the first position detection portion 30A that detects the storage position that is the position when the apparatus body portion is not in use, in other words, the position that detects the first position; the second position detection portion 30B that detects the normal position that is a position in which the projected area on the mount surface G is larger than that of the first position and that is the position when the apparatus body portion 2 reads the original with the reading portion 20, in other words, the position that detects the second position; the position change detection portion 40 that detects the change in the position of the apparatus body portion 2; and the control portion 50 that controls the supplying of electric power to the detection portions, namely, the first position detection portion 30A, the second position detection portion 30B, and the position change detection portion 40. Furthermore, when in the first power supplying mode that supplies the electric power to the first position detection portion 30A, the second position detection portion 30B, and the position change detection portion 40 while the apparatus body portion 2 is in the normal position, in a case in which the control portion 50 detects, with the first position detection portion 30A, switching of the apparatus body portion 2 to the storage position, the mode is transitioned to the second power supplying mode that does not supply the electric power to the first position detection portion 30A and the second position detection portion 30B and that supplies the electric power to the position change detection portion 40 (step S205 in FIG. 14).

With the above, power consumption can be suppressed, and an operation performed by the user dedicated to transition to such a state that suppresses power consumption will not be needed; accordingly, usability is improved.

Furthermore, in the second power supplying mode, when the change in the position of the apparatus body portion 2 is detected by the position change detection portion 40, the control portion 50 supplies the electric power to at least the second position detection portion 30B, and when switching of the apparatus body portion 2 to the normal position is detected by the second position detection portion 30B, transition to the first power supplying mode is made (step S203 in FIG. 14).

Since transition from the second power supplying mode to the first power supplying mode is made with the above, an operation performed by the user dedicated to transition to such a mode will not be needed; accordingly, usability is improved.

Furthermore, the scanner 1 includes the operation panel 7 that is the operation portion that receives various operations and that outputs signals according to the operations to the control portion 50. In a state in which the apparatus body portion 2 takes the normal position, when there is no input of a signal from the operation panel 7 for a predetermined time, the control portion 50 transitions the mode to the third power supplying mode (step S105 in FIG. 13). In the third power supplying mode, the consumed power in the entire apparatus is smaller than that of the first power supplying mode and is larger than that of the second power supplying mode, and the electric power is supplied to at least the position change detection portion 40. With the above, power consumption can be suppressed, and an operation performed by the user dedicated to transition to such a state that suppresses power consumption will not be needed; accordingly, usability is improved.

Furthermore, in the third power supplying mode, when the change in the position of the apparatus body portion 2 is detected by the position change detection portion 40, the electric power is supplied to at least the first position detection portion 30A, and when switching of the apparatus body portion 2 to the storage position is detected by the first position detection portion 30A, transition to the first power supplying mode is made (step S203 in FIG. 14). Since transition from the third power supplying mode to the first power supplying mode is made with the above, an operation performed by the user dedicated to transition to such a mode will not be needed; accordingly, usability is improved.

Furthermore, as illustrated in FIG. 10, the positions in the position change section S1 between the storage position and the normal position of the apparatus body portion 2 in which the change in the position of the apparatus body portion 2 can be detected with the position change detection portion 40 are set, in the position change section S1, to the position R1 that is closer to the storage position with respect to the middle position J, and to the position R2 that is closer to the normal position with respect to the middle position J. With the above, when the position of the apparatus body portion 2 changes from the normal position towards the storage position or, conversely, when the position of the apparatus body portion 2 changes from the storage position towards the normal position, the change in the position can be detected promptly and the switching of the power supplying mode can be executed promptly.

Furthermore, the position change detection portion 40 in the present exemplary embodiment includes the pivotable lever 42 and the detection portion 41 that detects the operation of the lever 42. The lever 42 is configured to pivot when switched between being in contact with the sensor contact surface 5d that extends along the position change section S1 and being separated from the sensor contact surface 5d. With the above, the position change detection portion 40 can be configured of not an optical sensor but of a so-called mechanical sensor, and a cost reduction of the apparatus can be achieved.

Note that in place of the mechanical sensor, an optical sensor can be adopted. In such a case, for example, a linear scale is provided in place of the sensor contact surface 5d, and an optical sensor that reads the linear scale is provided in place of the lever 42 and the detection portion 41, which allows the change in the position to be detected instantaneously while the apparatus body portion 2 is in any kind of position between the first position and the second position. Note that in such a case, desirably, the linear scale is provided across the entire area of the position change section S1.

Figure 15:
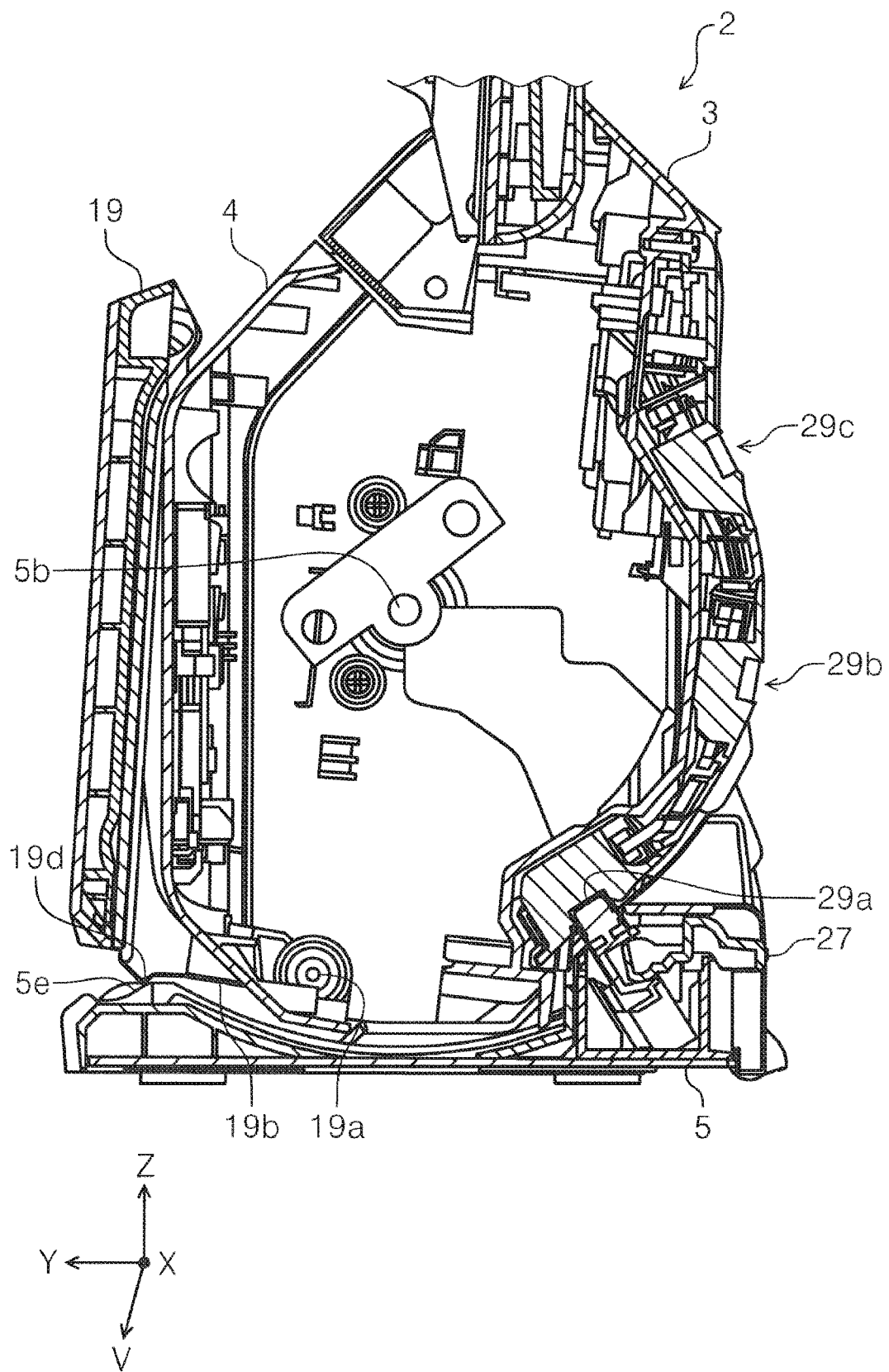
FIG. 15 is a cross-sectional view of the apparatus body portion in the first position.

Referring mainly to FIG. 15 and the figures after that, an operation when the user opens the front cover 19 while the apparatus body portion 2 is in the storage position will be described next.

FIG. 15 illustrates the apparatus body portion 2 in the storage position and the front cover 19 in the closed state. Furthermore, FIG. 16 illustrates a state of the slider unit 36 when the apparatus body portion 2 is in the storage position, and FIG. 17 illustrates a positional relationship between an abutting portion 19d and an inclined surface 5e described later when the apparatus body portion 2 is in the storage position.

Figure 16:
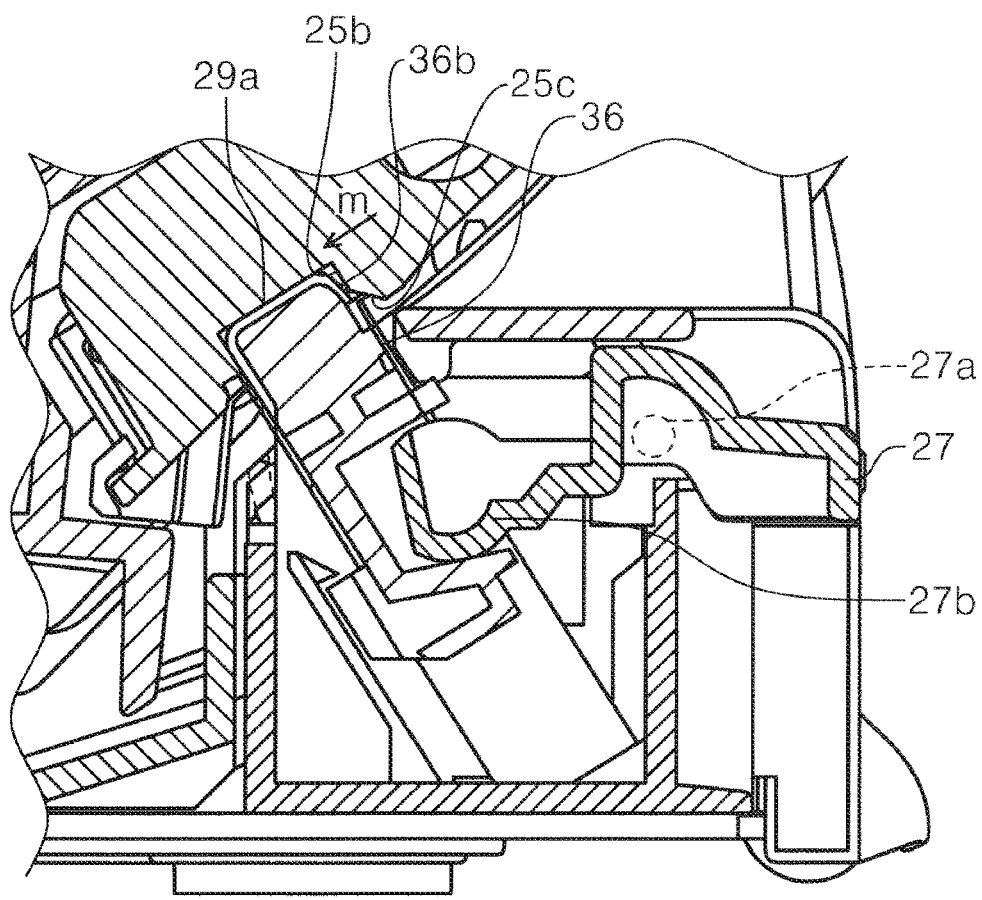
FIG. 16 is a cross-sectional view of a portion around a slider unit when the apparatus body portion is in the first position.
Figure 17:
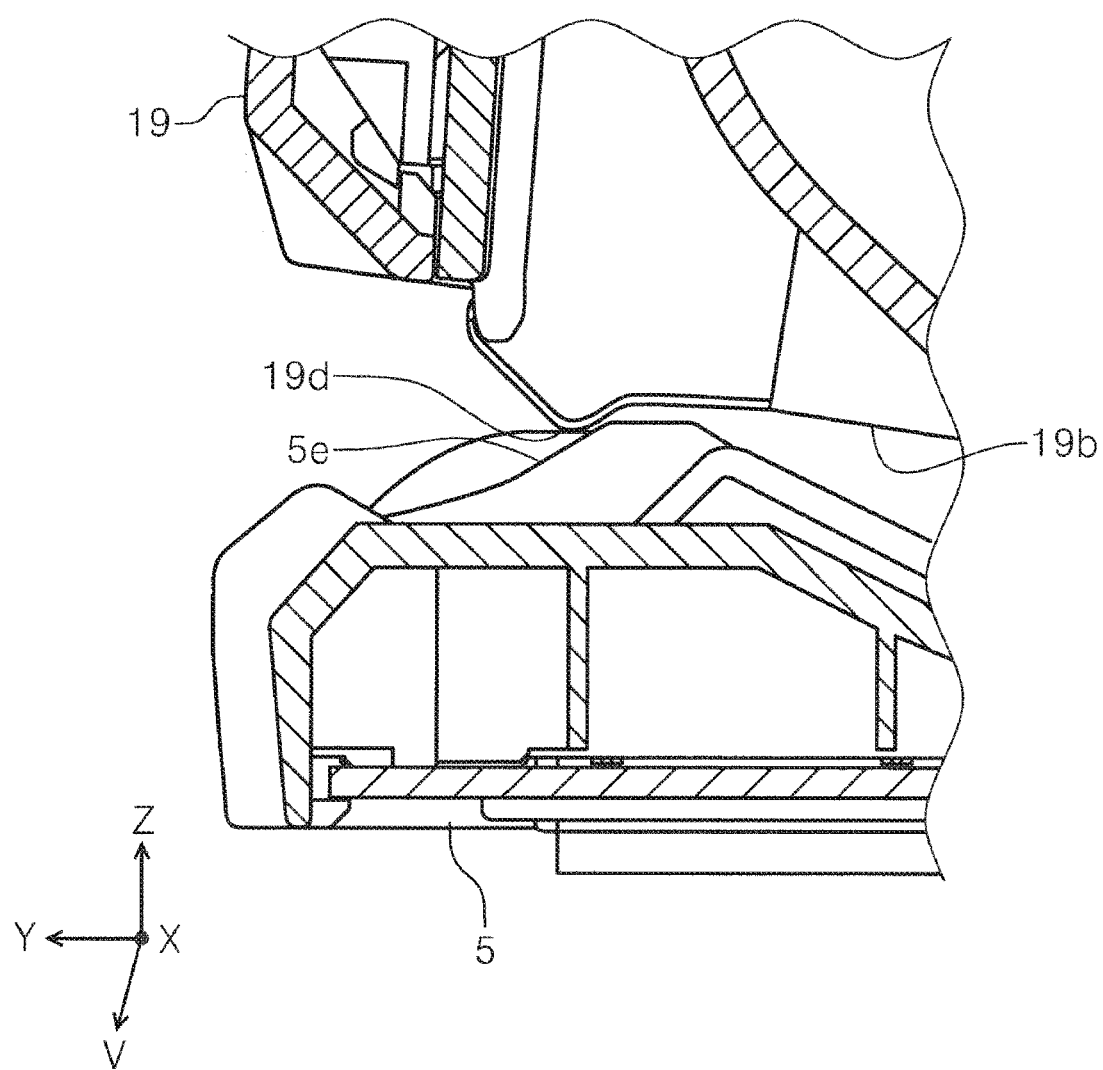
FIG. 17 is a cross-sectional view of a portion around an arm portion when the apparatus body portion is in the first position.

The storage position of the apparatus body portion 2 is maintained by, as illustrated in FIG. 16, having the front end portion of the slider unit 36 enter the first recessed portion 29a. In FIG. 16, a +R direction is a direction in which the slider unit 36 advances towards the first recessed portion 29a, and a −R direction is a direction in which the slider unit 36 retreats from the first recessed portion 29a. The slider unit 36 is pushed in the +R direction with the spring 37 (see FIG. 7).

Maintaining of the position of the apparatus body portion 2 can be canceled by operating the operation portion 27. The operation portion 27 is rotatable about a rotation shaft 27a, and an engagement portion 27b enters the slider unit 36. Accordingly, when the operation portion 27 is pushed upwards, the operation portion 27 rotates in the counterclockwise direction in FIG. 16, and the engagement portion 27b pushes the slider unit 36 down in the −R direction. With the above, the front end of the slider unit 36 retreats from the first recessed portion 29a and the maintaining of the position of the apparatus body portion 2 is released.

As illustrated in FIG. 15, the front cover 19 functioning as a discharge tray is provided in the lower unit 3, which constitutes the apparatus body portion 2, through arm portions 19b. The arm portions 19b are attached to lower unit 3 through the rotation shaft 19a. As illustrated in FIG. 2, the arm portions 19b are disposed on both sides of a discharge tray 19 in the original width direction.

Figure 19:
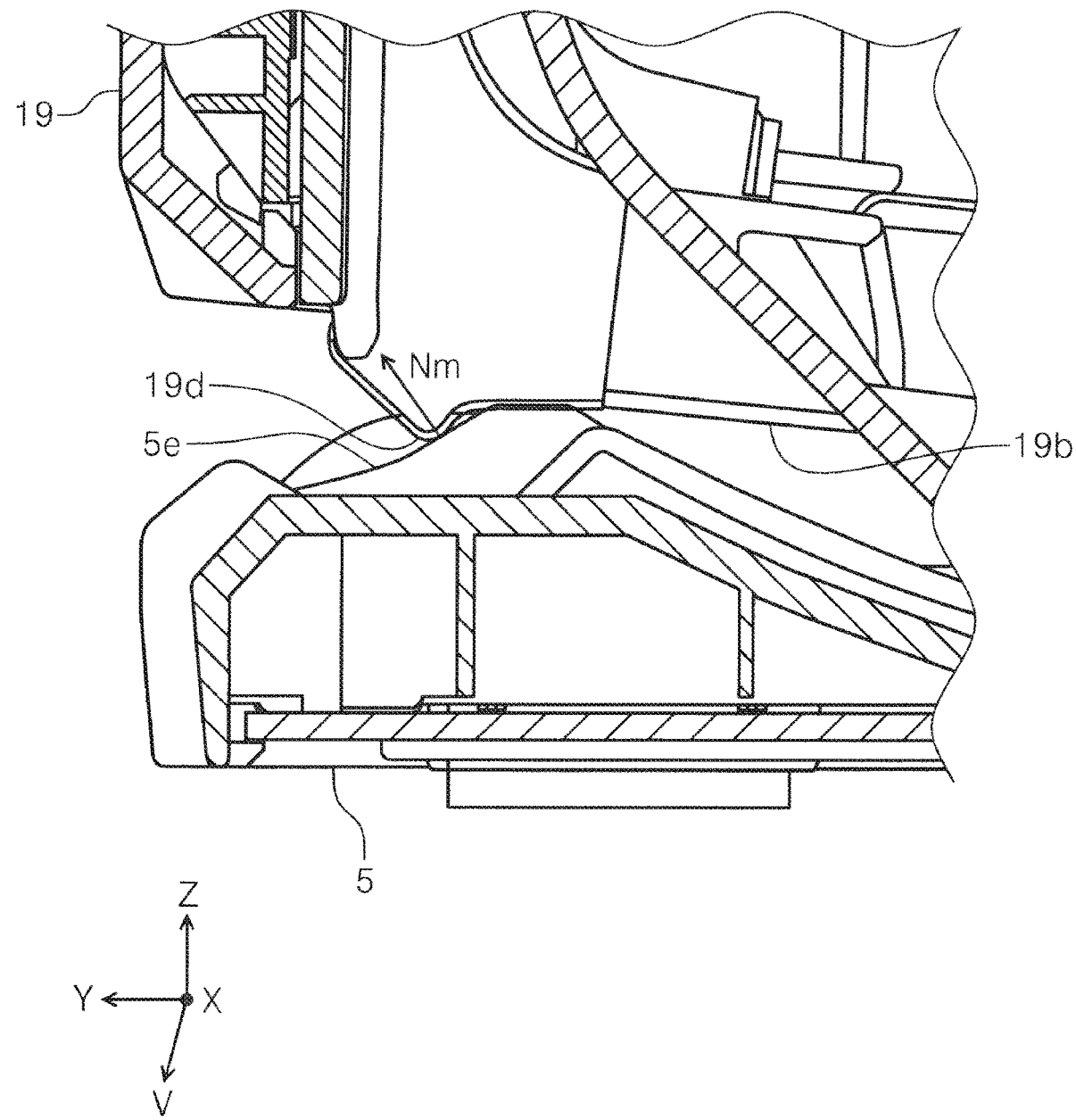
FIG. 19 is a cross-sectional view of a portion around the arm portion when the front cover in the closed state is opened.
Figure 22:
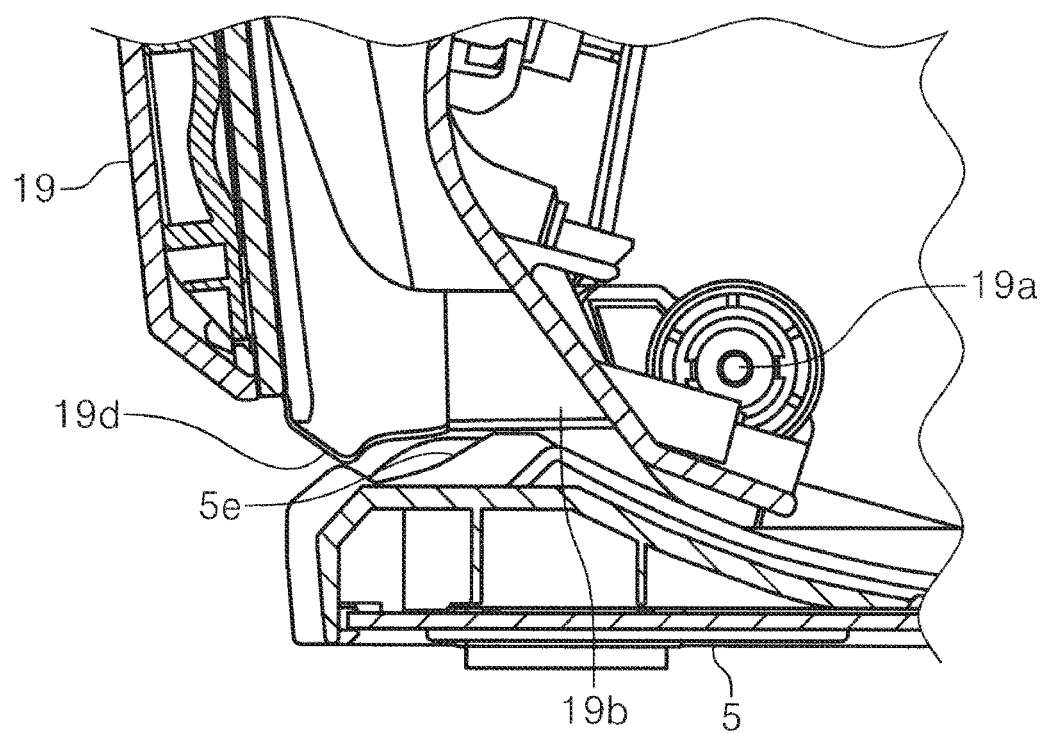
FIG. 22 is a cross-sectional view of the arm portion when the front cover in the closed state has been opened a predetermined amount.

As illustrated in FIGS. 17, 19, and 22, an abutting portion 19d is formed in the arm portion 19b at a position opposing the support portion 5, and an inclined surface 5e serving as an abutting surface is formed in the support portion 5 at a position opposing the abutting portion 19d.

Furthermore, from the state illustrated in FIG. 15, in other words, from a state in which the apparatus body portion 2 is in the storage position and the front cover 19 is closed, when the user attempts to open the front cover 19, as illustrated in FIG. 19, each abutting portion 19d becomes abutted against the corresponding inclined surface 5e. In so doing, due to the inclination angle of the inclined surface 5e, the abutting portion 19d receives reaction force Nm from the inclined surface 5e.

The reaction force Nm acts as an external force on the apparatus body portion 2 in the clockwise direction in FIG. 15, in other words, in a direction extending from the storage position towards the normal position.

Figure 18:
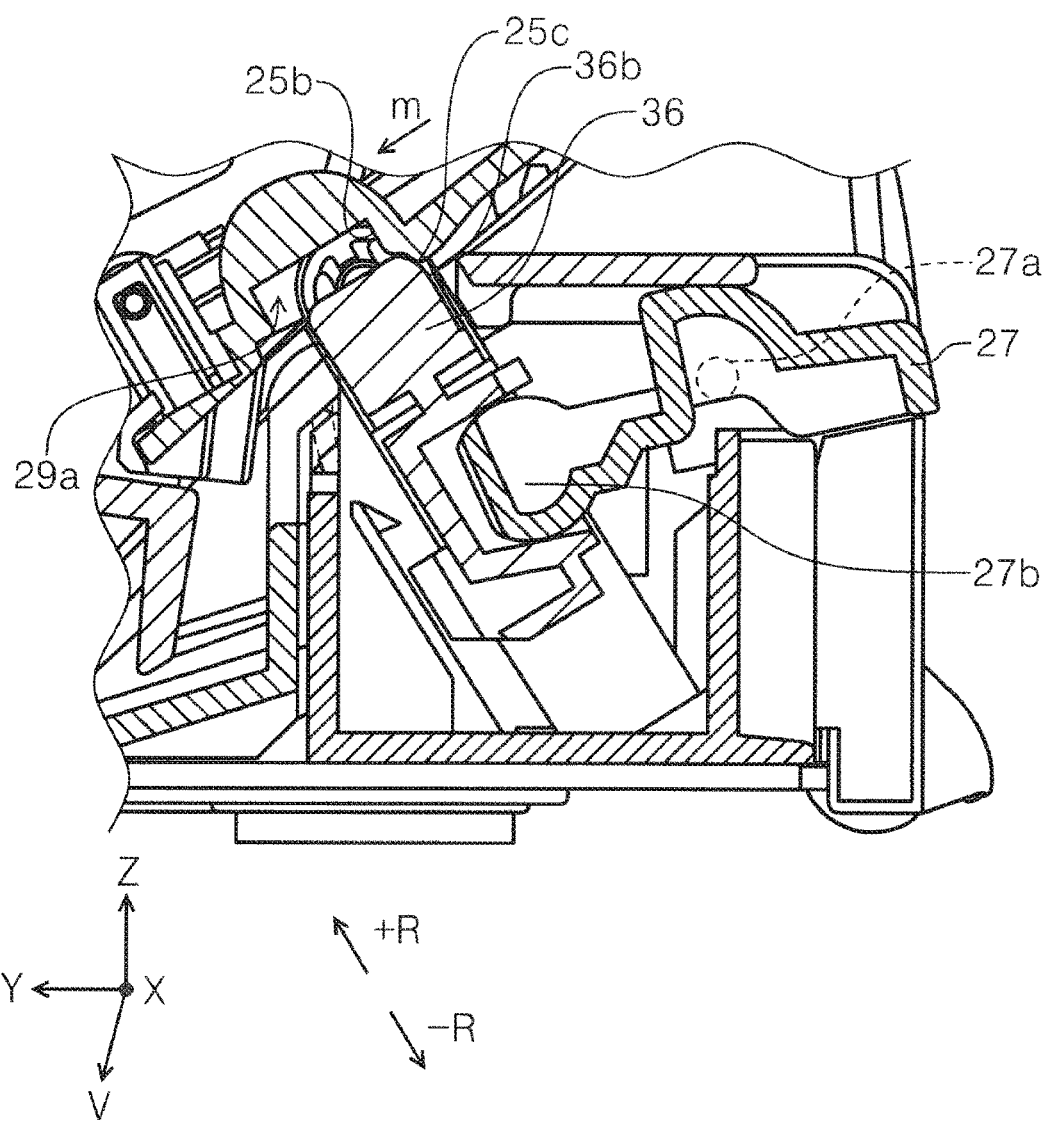
FIG. 18 is a cross-sectional view of a portion around the slider unit when the front cover in the closed state is opened.

An angular moment due to the reaction force Nm is depicted by an arrow m in FIG. 16. A wall portion 25b of the first recessed portion 29a is abutted against the slider unit 36 with the above angular moment m. In so doing, since an inclined surface 36b is formed in the front end portion of the slider unit 36 at a portion opposing the wall portion 25b, as illustrated in the change depicted from FIGS. 16 to 18, the slider unit 36 countering the spring force of the spring 37 (see FIG. 7) is pushed down in the −R direction. Furthermore, since an inclined surface 25c is formed at the entrance of the first recessed portion 29a, the front end portion of the slider unit 36 can move out from the first recessed portion 29a in a manner depicted in the change from FIGS. 18 to 21.

Figure 20:
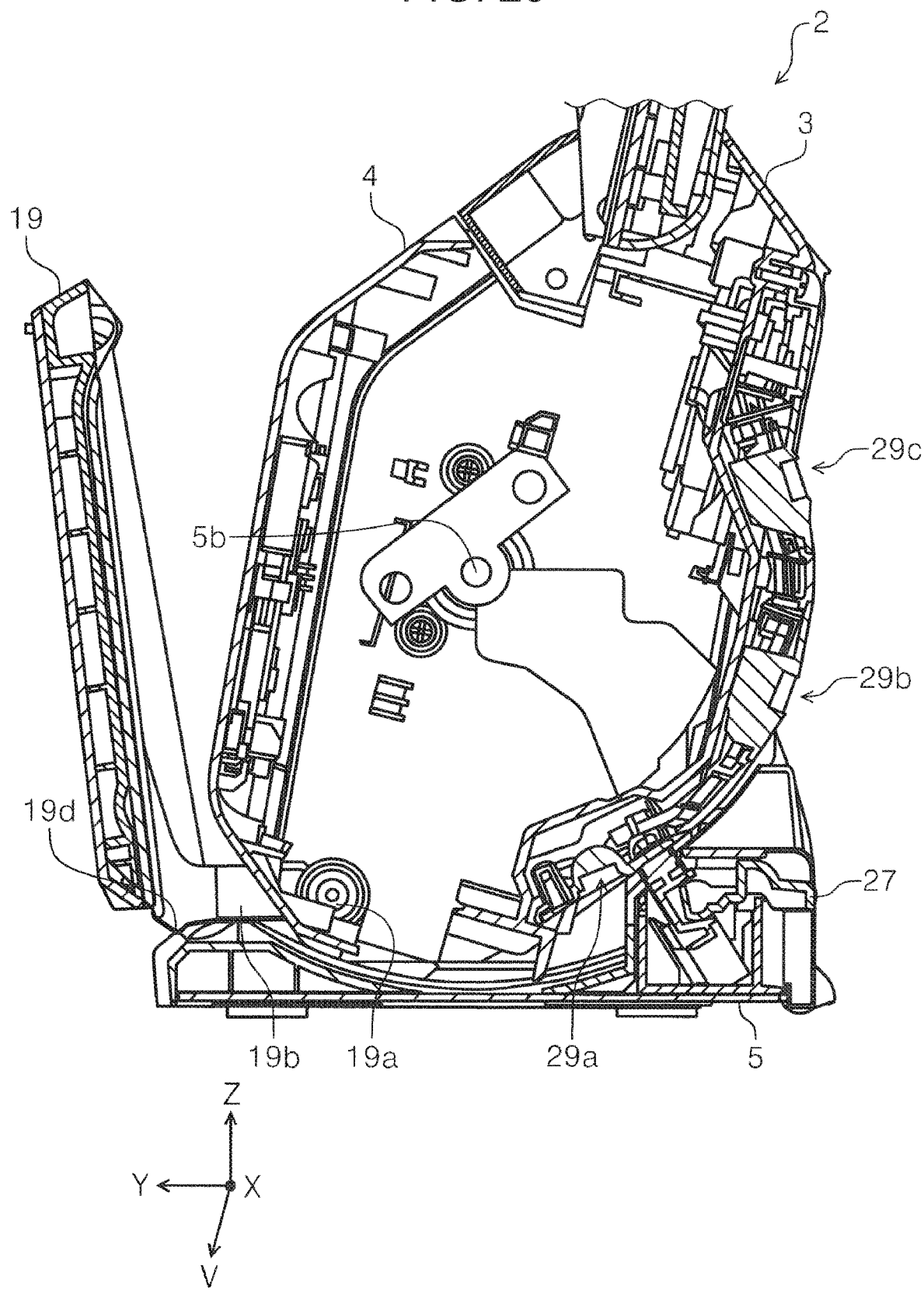
FIG. 20 is a cross-sectional view of the apparatus body portion when the front cover in the closed state has been opened a predetermined amount.
Figure 21:
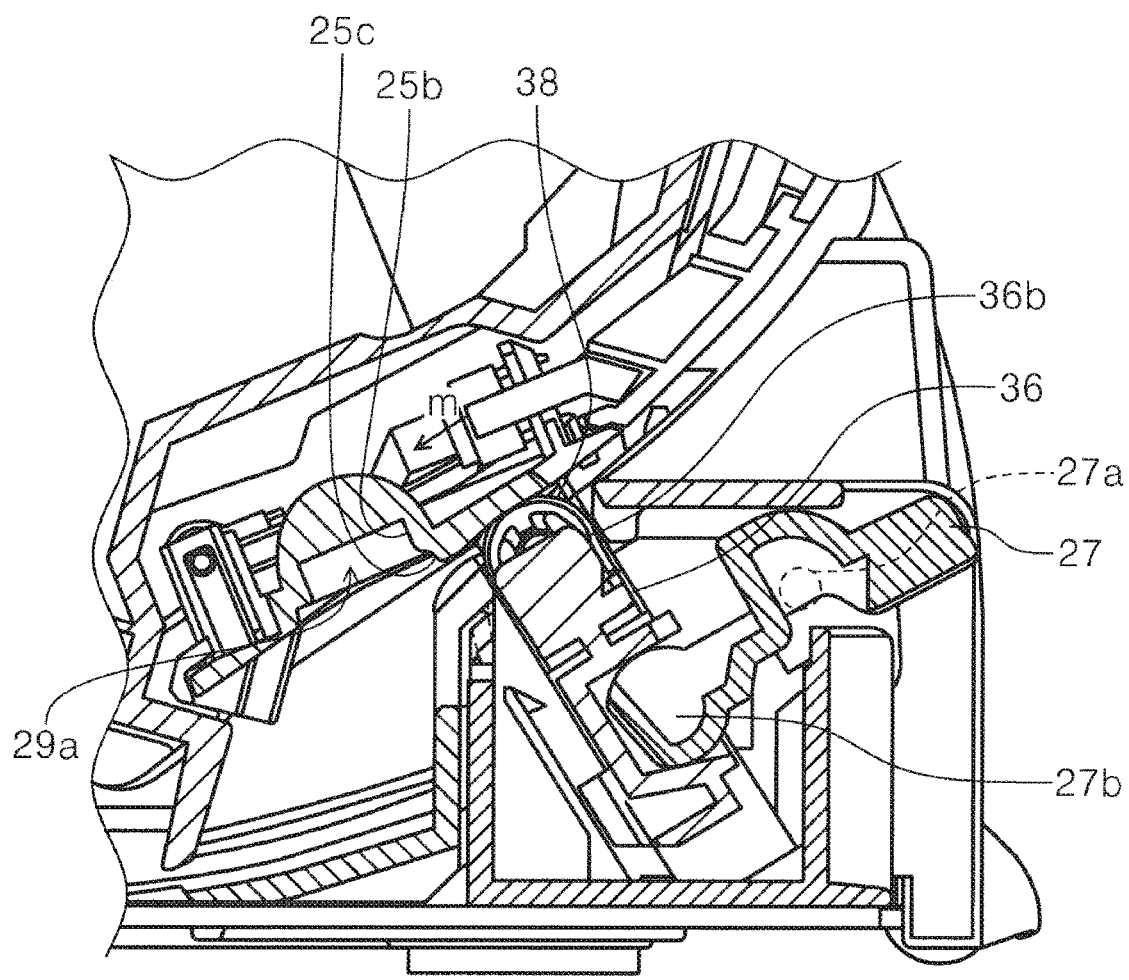
FIG. 21 is a cross-sectional view of the slider unit when the front cover in the closed state has been opened a predetermined amount.

FIG. 20 illustrates a state in which the front cover 19 has been opened a predetermined amount, FIG. 21 illustrates a state of the slider unit 36 when in the state in FIG. 20, and FIG. 22 illustrates a positional relationship between the abutting portion 19d and the inclined surface 5e when in the state in FIG. 20. Since the rotation shaft 19a of the front cover 19 moves in the +Y direction with the rotation of the apparatus body portion 2, a state in which the front cover 19 can be opened easily with the rotation of the apparatus body portion 2 is reached.

As described above, when the apparatus body portion 2 is in the storage position and when the front cover 19 is opened from the closed state, since the front cover 19 engages with the inclined surface 5e that is a portion of the support portion 5 and applies force to the apparatus body portion 2 in a direction switching the apparatus body portion 2 from the storage position to the normal position, the apparatus body portion 2 is switched from the storage position to the normal position; accordingly, other than the operation of opening the front cover 19 when using the apparatus, an operation of switching the apparatus body portion 2 from the storage position to the normal position is not needed and the usability of the apparatus is improved.

Furthermore, since the front cover 19 is attached in a rotatable manner to the apparatus body portion 2 through the arm portions 19b, and the support portion 5 includes the inclined surface 5e, and when the apparatus body portion 2 is in the storage position and when the front cover 19 is opened from the closed state, the abutting portions 19d of the arm portions 19b abut against the inclined surface 5e so that the arm portions 19b apply force to the apparatus body portion 2 in the direction in which the apparatus body portion 2 is switched from the storage position to the normal position, a member allowing the front cover 19 to apply force to the apparatus body portion 2 in the direction switching the apparatus body portion 2 from the storage position to the normal position can be obtained with a simple configuration.

As described while referring to FIG. 14, in the second power supplying mode, when the control portion 50 detects the change in the apparatus body portion 2 from the storage position to the normal position (Yes in step S202 in FIG. 14), the transition is made to the first power supplying mode (step S203 in FIG. 14); accordingly, the user does not have to perform an operation pertaining to the power source after the position of the apparatus body portion 2 has been changed from the storage position to the normal position and the usability of the apparatus is improved.

In other words, the front cover 19 is also configured as an operation portion that activates the power.

As described while referring to FIG. 14, when the control portion 50 detects the change in the apparatus body portion 2 from the normal position to the storage position (Yes in step S204 in FIG. 14), the transition is made to the second power supplying mode (step S205 in FIG. 14); accordingly, the user does not have to perform an operation pertaining to the power source after the position of the apparatus body portion 2 has been changed from the normal position to the storage position and the usability of the apparatus is improved.

Note that as illustrated by the comparison between FIGS. 1 and 2, the front cover 19 in the closed state covers the operation panel 7 serving as a display portion, and by opening the front cover 19, the operation panel 7 is exposed. In the second power supplying mode, the backlight of the operation panel 7 is off, and in the first power supplying mode, the backlight of the operation panel 7 is tuned on; accordingly, the user can confirm the power status of the apparatus with the operation panel 7.

Note that in other words, the above configuration can be denoted as a configuration in which, when in the second power supplying mode, a transition to the first power supplying mode is made when the front cover 19 in the closed state is opened. With the above, the user does not have to perform an operation pertaining to the power source after the front cover 19 is opened; accordingly, usability is improved. Note that such an advantageous effect can also be obtained in a configuration in which there is no positional change in the apparatus body portion 2 when opening the front cover 19 and, further, can be obtained in a configuration in which positional change in the apparatus body portion 2 cannot be made.

The present disclosure is not limited to the exemplary embodiments described above and various modifications can be made within the scope of the disclosure stated in the claims, which are, naturally, also included in the scope of the present disclosure.

What is claimed is:

1. An image reading apparatus comprising:
a support portion in contact with a mount surface on which the apparatus is mounted;
an apparatus body portion that includes a reading sensor that reads an original, the apparatus body portion being provided so that a position thereof is changeable by being rotated relative to the support portion; and
a discharge tray provided so as to be openable/closeable by being rotated relative to the apparatus body portion, the discharge tray, by being open, receiving the original discharged from the apparatus body portion, wherein
the apparatus body portion is switchable between
a first position that is a position while not in use, and
a second position that is a position of the apparatus body portion when reading of the original with the reading sensor is performed and that is a position in which a projected area of the apparatus body portion on the mount surface is larger than that of the first position, and when the apparatus body portion is in the first position and when the discharge tray is opened from the closed state, the discharge tray abuts against the support portion and applies force to the apparatus body portion in a direction that switches the apparatus body portion from the first position to the second position to switch the apparatus body portion from the first position to the second position.

2. The image reading apparatus according to claim 1, wherein the discharge tray includes an arm portion, the discharge tray being rotatably attached to the apparatus body portion through the arm portion, the support portion including an abutting surface, and when the apparatus body portion is in the first position and when the discharge tray is opened from the closed state, the arm portion abuts against the abutting surface to apply force to the apparatus body portion in the direction that switches the apparatus body portion from the first position to the second position.

3. The image reading apparatus according to claim 1, further comprising:

a controller that controls supplying of electric power in the apparatus body portion;

a first position detector that detects the first position of the apparatus body portion; and a second position detector that detects the second position of the apparatus body portion, wherein the controller is configured to switch between a first power supplying mode that is a power supplying mode when the reading sensor reads the original, and a second power supplying mode that is a power supplying mode in which consumption of electric power is smaller than that of the first power supplying mode and that is a power supplying mode while the apparatus body portion is not in use, and in a case in which the position of the apparatus body portion is in the first position and in which the apparatus body portion is in the second power supplying mode, when a change in the apparatus body portion from the first position to the second position is detected, the controller makes a transition to the first power supplying mode.

4. The image reading apparatus according to claim 3, wherein when a change in the apparatus body portion from the second position to the first position is detected, the controller makes a transition to the second power supplying mode.

5. The image reading apparatus according to claim 1, wherein a display panel configured to allow visual confirmation of a power status is provided in the apparatus body portion, and the discharge tray covers the display panel when in a closed state and exposes the display panel when opened.

6. The image reading apparatus according to claim 1, further comprising an attenuating member that attenuates a rotation of the discharge tray in at least an opening direction thereof.

* * * * *